(12) United States Patent
Oguni et al.

(10) Patent No.: US 8,685,569 B2
(45) Date of Patent: Apr. 1, 2014

(54) ELECTRODE FOR POWER STORAGE DEVICE AND POWER STORAGE DEVICE

(75) Inventors: Teppei Oguni, Kanagawa (JP); Takeshi Osada, Kanagawa (JP); Toshihiko Takeuchi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/586,093

(22) Filed: Aug. 15, 2012

(65) Prior Publication Data

US 2013/0043057 A1  Feb. 21, 2013

(30) Foreign Application Priority Data

Aug. 19, 2011 (JP) ................................. 2011-179958
Aug. 19, 2011 (JP) ................................. 2011-179959

(51) Int. Cl.
*H01M 4/36* (2006.01)
*H01M 4/66* (2006.01)

(52) U.S. Cl.
USPC .................. 429/231.8; 429/218.1; 429/245

(58) Field of Classification Search
None
See application file for complete search history.

(56) References Cited

U.S. PATENT DOCUMENTS

| | | |
|---|---|---|
| 4,628,015 A | 12/1986 | Yata et al. |
| 6,383,686 B1 | 5/2002 | Umeno et al. |
| 7,179,561 B2 | 2/2007 | Niu et al. |
| 7,745,047 B2 | 6/2010 | Zhamu et al. |
| 7,842,432 B2 | 11/2010 | Niu et al. |
| 7,939,218 B2 | 5/2011 | Niu |
| 7,977,007 B2 | 7/2011 | Niu et al. |
| 7,977,013 B2 | 7/2011 | Niu et al. |
| 8,278,011 B2 | 10/2012 | Zhu et al. |
| 2007/0131915 A1 | 6/2007 | Stankovich et al. |
| 2008/0254296 A1 | 10/2008 | Handa et al. |
| 2009/0110627 A1 | 4/2009 | Choi et al. |

(Continued)

FOREIGN PATENT DOCUMENTS

| | | |
|---|---|---|
| JP | 06-060870 | 3/1994 |
| JP | 2001-210315 | 8/2001 |

(Continued)

OTHER PUBLICATIONS

Zhou.X et al., "Graphene modified LiFePO4 cathode materials for high power lithium ion batteries ,", J. Mater. Chem. (Journal of Materials Chemistry), 2011, vol. 21, pp. 3353-3358.

(Continued)

*Primary Examiner* — John S Maples
(74) *Attorney, Agent, or Firm* — Nixon Peabody LLP; Jeffrey L. Costellia

(57) ABSTRACT

An electrode for a power storage device with good cycle characteristics and high charge/discharge capacity is provided. In addition, a power storage device including the electrode is provided. The electrode for the power storage device includes a conductive layer and an active material layer provided over the conductive layer, the active material layer includes graphene and an active material including a plurality of whiskers, and the graphene is provided to be attached to a surface portion of the active material including a plurality of whiskers and to have holes in part of the active material layer. Further, in the electrode for the power storage device, the graphene is provided to be attached to a surface portion of the active material including a plurality of whiskers and to cover the active material including a plurality of whiskers. Further, the power storage device including the electrode is manufactured.

14 Claims, 10 Drawing Sheets

(56) References Cited

U.S. PATENT DOCUMENTS

| | | |
|---|---|---|
| 2009/0117467 A1 | 5/2009 | Zhamu et al. |
| 2009/0123850 A1 | 5/2009 | Takeuchi et al. |
| 2009/0253045 A1 | 10/2009 | Kotato et al. |
| 2010/0021819 A1 | 1/2010 | Zhamu et al. |
| 2010/0078591 A1 | 4/2010 | Sano et al. |
| 2010/0081057 A1 | 4/2010 | Liu et al. |
| 2010/0143798 A1 | 6/2010 | Zhamu et al. |
| 2010/0176337 A1 | 7/2010 | Zhamu et al. |
| 2010/0233538 A1 | 9/2010 | Nesper et al. |
| 2010/0233546 A1 | 9/2010 | Nesper et al. |
| 2010/0248034 A1 | 9/2010 | Oki et al. |
| 2010/0291438 A1 | 11/2010 | Ahn et al. |
| 2010/0308277 A1 | 12/2010 | Grupp |
| 2010/0330421 A1 | 12/2010 | Cui et al. |
| 2011/0012067 A1 | 1/2011 | Kay |
| 2011/0070146 A1 | 3/2011 | Song et al. |
| 2011/0111299 A1 | 5/2011 | Liu et al. |
| 2011/0111303 A1 | 5/2011 | Kung et al. |
| 2011/0121240 A1 | 5/2011 | Amine et al. |
| 2011/0133131 A1 | 6/2011 | Zhou et al. |
| 2011/0159372 A1 | 6/2011 | Zhamu et al. |
| 2011/0183203 A1 | 7/2011 | Du et al. |
| 2011/0227000 A1 | 9/2011 | Ruoff et al. |
| 2011/0229795 A1 | 9/2011 | Niu et al. |
| 2011/0266654 A1 | 11/2011 | Kuriki et al. |
| 2011/0289767 A1 | 12/2011 | Yamazaki |
| 2011/0292564 A1 | 12/2011 | Yamazaki |
| 2011/0294005 A1 | 12/2011 | Kuriki et al. |
| 2011/0294011 A1 | 12/2011 | Kuriki et al. |
| 2011/0300445 A1 | 12/2011 | Murakami et al. |
| 2011/0305950 A1 | 12/2011 | Kuriki et al. |
| 2012/0003383 A1 | 1/2012 | Furuno |
| 2012/0003530 A1 | 1/2012 | Kuriki et al. |
| 2012/0003807 A1 | 1/2012 | Furuno et al. |
| 2012/0015247 A1 | 1/2012 | Yoshida |
| 2012/0045692 A1 | 2/2012 | Takemura et al. |
| 2012/0058397 A1 | 3/2012 | Zhamu et al. |
| 2012/0070738 A1 | 3/2012 | Yoshida |
| 2012/0088151 A1 | 4/2012 | Yamazaki et al. |
| 2012/0088156 A1 | 4/2012 | Nomoto et al. |
| 2012/0135302 A1 | 5/2012 | Yokoi et al. |
| 2012/0156556 A1 | 6/2012 | Kuriki et al. |
| 2012/0244430 A1 | 9/2012 | Yamazaki et al. |
| 2012/0308884 A1 | 12/2012 | Oguni et al. |
| 2012/0308891 A1 | 12/2012 | Todoriki et al. |
| 2012/0308894 A1 | 12/2012 | Oguni et al. |
| 2012/0328951 A1 | 12/2012 | Hirohashi et al. |
| 2012/0328953 A1 | 12/2012 | Hirohashi et al. |
| 2012/0328956 A1 | 12/2012 | Oguni et al. |
| 2013/0017443 A1 | 1/2013 | Yamazaki |
| 2013/0071751 A1* | 3/2013 | Tajima et al. ............. 429/231.8 |
| 2013/0071762 A1* | 3/2013 | Tajima et al. ............. 429/405 |
| 2013/0183226 A1 | 7/2013 | Todoriki et al. |

FOREIGN PATENT DOCUMENTS

| | | |
|---|---|---|
| JP | 2002-063894 | 2/2002 |
| JP | 2006-265751 | 10/2006 |
| JP | 2008-103118 | 5/2008 |
| JP | 2000-215887 | 8/2008 |
| JP | 2008-257894 | 10/2008 |
| JP | 2009-524567 | 7/2009 |
| JP | 2009-176721 | 8/2009 |
| JP | 2010-129332 | 6/2010 |
| JP | 2011-503804 | 1/2011 |
| JP | 2011-048992 | 3/2011 |
| JP | 2011-057541 | 3/2011 |
| JP | 2011-517053 | 5/2011 |
| WO | WO-2006/062947 A2 | 6/2006 |
| WO | WO-2007/061945 A2 | 5/2007 |
| WO | WO-2009/061685 A1 | 5/2009 |
| WO | WO-2009/127901 A1 | 10/2009 |
| WO | WO-2009/144600 A2 | 12/2009 |

OTHER PUBLICATIONS

Su.F et al., "Flexible and planar graphene conductive additives for lithium-ion batteries,", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors,", Nano Letters, 2011, vol. 11, No. 7, pp. 2905-2911.

English Translation of "Graphene; Functions and Applications", CMC Publishing Co., Ltd., pp. 171-172.

Padhi et al. "Phospho-Olivines as Positive-Electrode Materials for Rechargeable Lithium Batteries", Journal of the Electrochemical Society, Apr. 1, 1997, vol. 144, No. 4, pp. 1188-1194.

Chan et al., "High-Performance Lithium Battery Anodes Using Silicon Nanowires", Nature Nanotechnology, Jan. 2008, vol. 3, pp. 31-35.

Yonezawa et al., "Fabrication of Graphene Oxide Membrane by Electrophoretic Deposition", Proceedings of the 57th Spring Meeting, The Japan Society of Applied Physics and Related Societies, Mar. 17, 2010, p. 17-040.

English Translation of "Graphene; Functions and Applications", CMC Publishing Co., Ltd., Jul. 31, 2009, pp. 171-172.

* cited by examiner

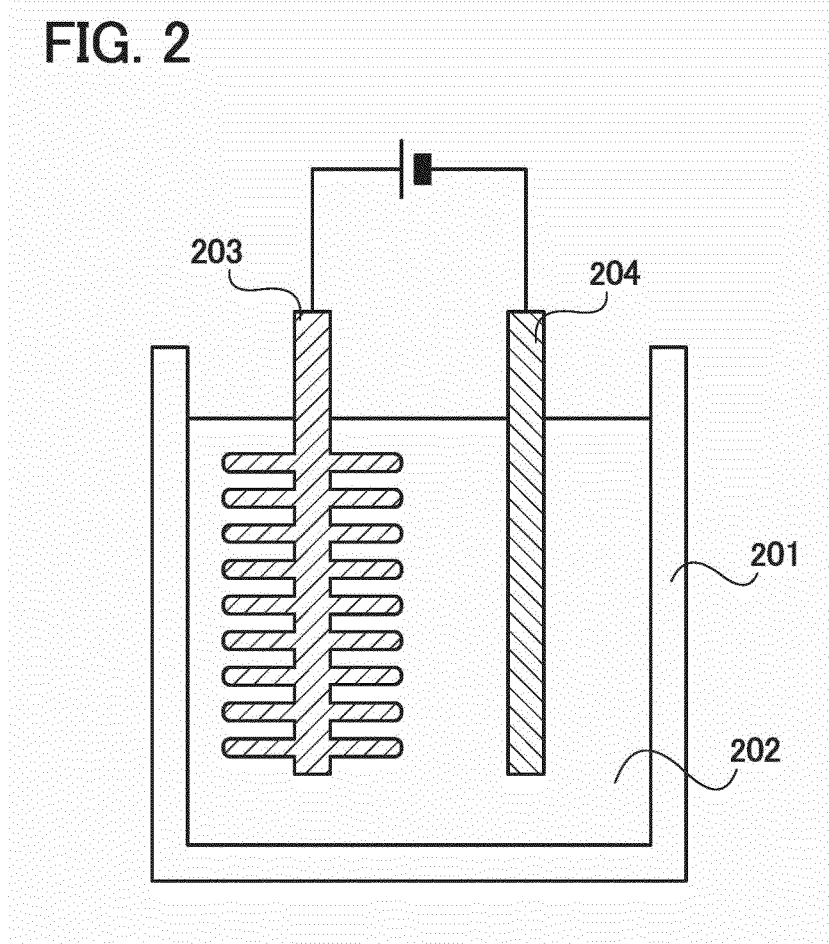

111a 109a 103 107a 111b carbon film deposited by evaporation treatment natural oxide film 113    carbon film deposited by evaporation treatment 111b carbon film deposited by evaporation treatment

X hole 111a  109a  107a  103

⊢—⊣ 1 μm carbon film deposited by evaporation treatment

115

4.6nm 5.2nm 5.6nm

⊢—⊣ 10 nm

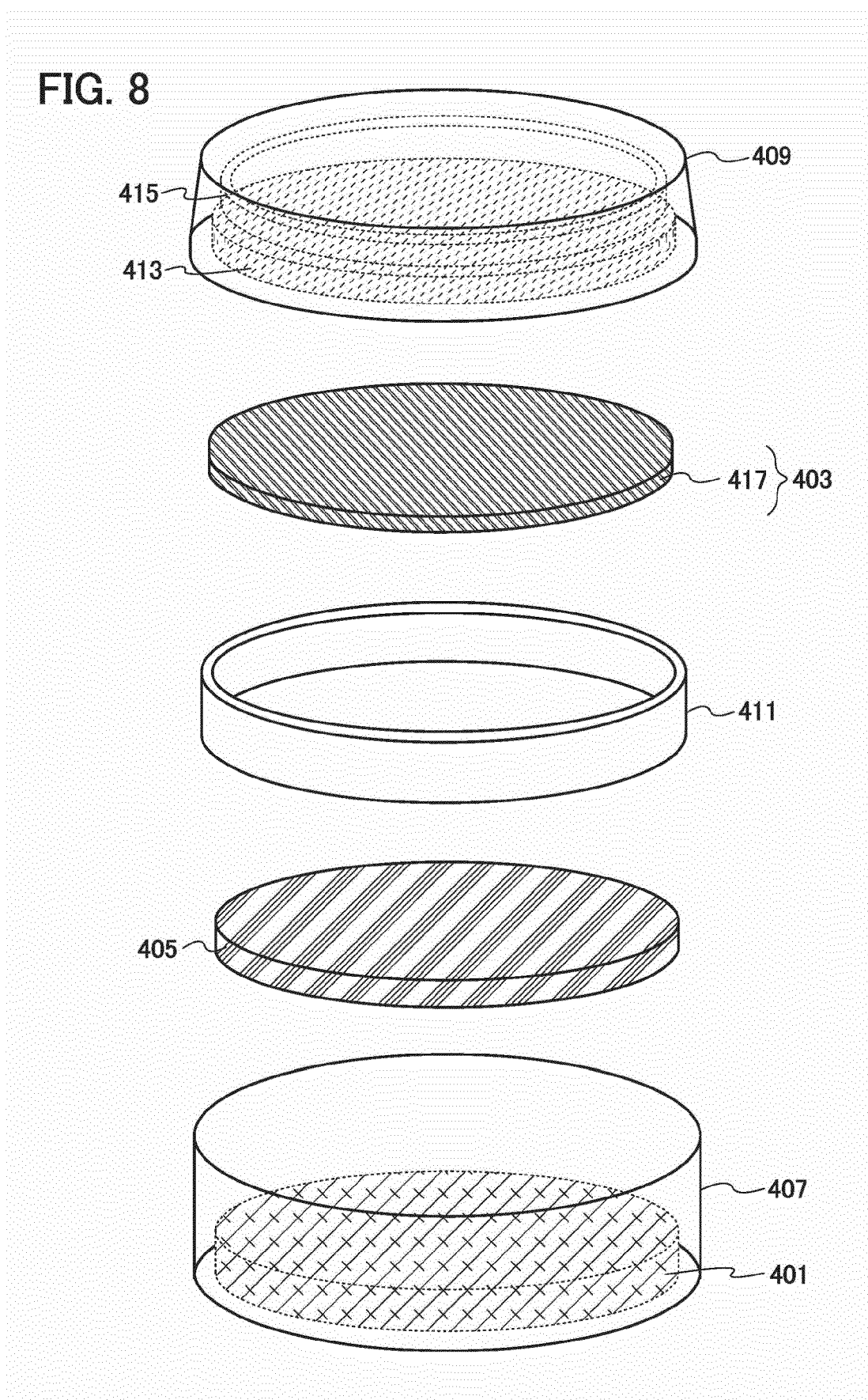

ELECTRODE FOR POWER STORAGE DEVICE AND POWER STORAGE DEVICE

BACKGROUND OF THE INVENTION

1. Field of the Invention

The present invention relates to an electrode for a power storage device and a power storage device including the electrode.

Note that the power storage device indicates all elements and devices which have a function of storing power.

2. Description of the Related Art

In recent years, power storage devices such as lithium-ion secondary batteries, lithium-ion capacitors, and air cells have been developed.

An electrode for a power storage device is manufactured by forming an active material layer over one surface of a current collector. As the active material, a material which can occlude and release ions, such as carbon or silicon, is used. In addition, phosphorus-doped silicon has larger theoretical capacity than carbon and thus is advantageous in terms of increasing capacity of a power storage device (see Patent Document 1).

Owing to excellent electric characteristics such as high conductivity (high electron mobility) and physical characteristics such as flexibility and mechanical strength, application of graphene to a variety of products has been attempted (see Patent Documents 2 and 3). In addition, a technique for applying graphene to a lithium-ion secondary battery has been proposed (see Patent Document 4).

REFERENCE

Patent Document

[Patent Document 1] Japanese Published Patent Application No. 2001-210315
[Patent Document 2] United States Published Patent Application No. 2009/0110627
[Patent Document 3] United States Published Patent Application No. 2007/0131915
[Patent Document 4] United States Published Patent Application No. 2010/0081057

SUMMARY OF THE INVENTION

When silicon is used as an active material layer of an electrode for a power storage device, the silicon expands and contracts repeatedly due to repeated charge/discharge cycles. As a result, the silicon which is used as an active material layer turns into fine powder and separation or the like is caused, which deteriorates properties of the power storage device.

Further, even when silicon is used as an active material layer, it is difficult to obtain charge/discharge capacity as high as the theoretical capacity.

Thus, an object of one embodiment of the present invention is to provide an electrode for a power storage device with good cycle characteristics and high charge/discharge capacity. In addition, another object is to provide a power storage device including the electrode.

One embodiment of the present invention is an electrode for a power storage device which includes a conductive layer and an active material layer provided over the conductive layer, and in which the active material layer includes graphene and an active material including a plurality of whiskers, and the graphene is provided to be attached to a surface portion of the active material including a plurality of whiskers and to have holes in part of the active material layer.

Another embodiment of the present invention is an electrode for a power storage device, in which the active material layer includes graphene and the active material including a plurality of whiskers and the graphene is provided to be attached to a surface portion of the active material including a plurality of whiskers and to cover the active material including a plurality of whiskers. Further, the graphene is provided to spread continuously over the active material including a plurality of whiskers in a plan view of the active material layer.

In any of the above structures, the active material including a plurality of whiskers includes at least a core which has a structure having crystallinity and an outer shell which is provided to cover the core and has an amorphous structure.

Further, in any of the above structures, a material of the active material including a plurality of whiskers is silicon, for example.

Furthermore, in any of the above structures, a material of the conductive layer is preferably titanium, zirconium, hafnium, vanadium, niobium, tantalum, chromium, molybdenum, tungsten, cobalt, or nickel.

Still another embodiment of the present invention is a power storage device including the electrode having any of the above structures.

In the electrode for a power storage device which is an embodiment of the present invention, even if the volume of the active material including a whisker is changed due to occlusion and release of ions, the graphene relieves stress caused by the change in volume, so that the structure of the electrode is not easily damaged, for example, pulverization and separation of the active material including a whisker. According to one embodiment of the present invention, an electrode for a power storage device which can improve cycle characteristics can be provided, and in addition, by including the electrode, a power storage device with improved cycle characteristics can be provided.

Further, the electrode for a power storage device which is an embodiment of the present invention has excellent electric characteristics, because, for example, a core which has a structure having crystallinity is provided in the active material including a plurality of whiskers, and graphene which has high conductivity (high electron mobility) is provided between the active material including a plurality of whiskers. According to one embodiment of the present invention, an electrode for a power storage device which can improve charge/discharge capacity can be provided, and in addition, by including the electrode, a power storage device with improved charge/discharge capacity can be provided.

BRIEF DESCRIPTION OF THE DRAWINGS

In the accompanying drawings:

FIG. 2 is a cross-sectional view for illustrating an electrophoresis method;

FIG. 8 is a perspective view illustrating a manufacturing method of a power storage device according to one embodiment of the present invention;

DETAILED DESCRIPTION OF THE INVENTION

Figure 1A:
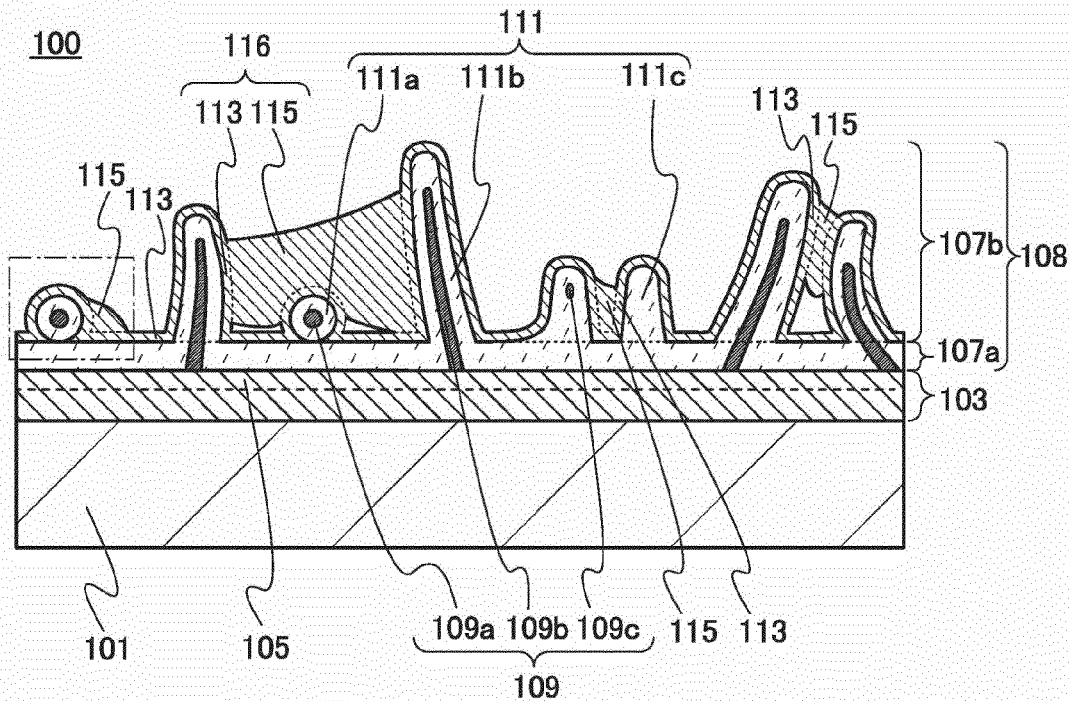
FIGS. 1A and 1B are schematic cross-sectional views each illustrating a surface of an electrode for a power storage device according to one embodiment of the present invention.

Embodiments and examples of the present invention will be described hereinafter with reference to the drawings. Note that the invention is not limited to the following description, and it will be easily understood by those skilled in the art that various changes and modifications can be made without departing from the spirit and scope of the invention. Thus, the present invention should not be interpreted as being limited to the following description of the embodiments. In description with reference to the drawings, in some cases, the same reference numerals are used in common for the same portions in different drawings. Further, in some cases, the same hatching patterns are applied to similar parts, and the similar parts are not necessarily designated by reference numerals.

Embodiment 1

In this embodiment, an electrode according to an embodiment of the present invention and a method for manufacturing the electrode will be described with reference to the drawings.

Figure 1B:
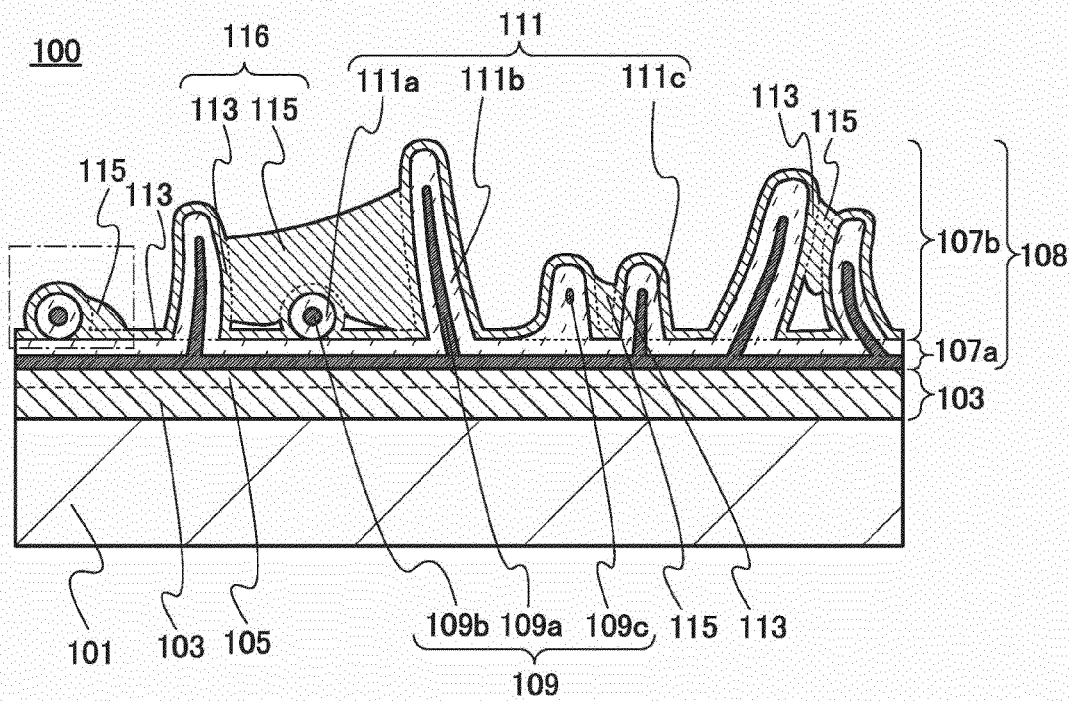

FIGS. 1A and 1B are schematic cross-sectional views illustrating part of a surface of an electrode 100 according to one embodiment of the present invention. The electrode 100 includes a substrate 101, a conductive layer 103 provided over the substrate 101, and an active material layer 108 provided over the conductive layer 103.

The active material layer 108 includes an active material including a plurality of whiskers including a region 107a and a region 107b, and graphene 116 including a first region 113 and a second region 115 and being in contact with the active material including a plurality of whiskers. Note that in this specification, an active material including a whisker refers to an active material including a flat region such as the region 107a and a projecting region from the region 107a like a whisker (or like a string or a fiber) such as the region 107b. Further, in order to clearly show that the active material layer 108 includes a plurality of whiskers each of which is a projecting region of the active material, as illustrated in FIGS. 1A and 1B, the active material including the region 107a and the region 107b is referred to as the active material including a plurality of whiskers.

The region 107a is provided in contact with the conductive layer 103 and the region 107b projects from the region 107a and is provided to be dispersed at random. Therefore, the active material layer 108 has a fine surface structure reflecting the shapes of the active material including a plurality of whiskers.

Further, a mixed layer 105 may be provided in a part of or the whole of a surface layer of the conductive layer 103 by reaction with the active material layer 108 (in particular, the active material including a plurality of whiskers). Note that the mixed layer 105 also functions as a conductive layer because the mixed layer 105 has conductivity. In the case where the mixed layer 105 is formed on the part of the surface layer of the conductive layer 103, the mixed layer 105 and the part of the conductive layer 103 are provided below the active material including a plurality of whiskers (in particular, the region 107a) (not illustrated). In the case where the mixed layer 105 is formed on the whole of the surface layer of the conductive layer 103, the mixed layer 105 is provided below the active material including a plurality of whiskers (in particular, the region 107a) (see FIGS. 1A and 1B).

Note that the interface between the region 107a and the region 107b is not clear. Thus, the following surface is defined as the interface between the region 107a and the region 107b: a surface which is in contact with a bottom of the lowest hollow of hollows each formed in the active material layer 108 (between the active materials including a plurality of whiskers) and parallel to a surface of the substrate 101 or the conductive layer 103.

In the active material layer 108, the active material including a plurality of whiskers preferably includes a core 109 which has a structure having crystallinity and an outer shell 111 which has an amorphous structure. The amorphous structure has a feature of resistance to change in volume due to occlusion and release of ions (e.g., stress caused by change in volume is relieved). The structure having crystallinity has an excellent conductivity and ion mobility and has a feature of high speeds of occlusion and release of ions per unit mass. Therefore, by using the electrode 100 including the active material including a plurality of whiskers including the core 109 and the outer shell 111, output characteristics are improved, and a power storage device with high charge/discharge capacity and improved cycle characteristics can be manufactured.

Note that the core 109 is not limited to the core which is in contact with the conductive layer 103 such as a core 109b, and may be the core which extends from front to back of the drawing such as a core 109b and the core which is localized such as a core 109c. That is, the core 109a, the core 109b, and the core 109c are collectively referred to as the core 109. Further, an outer shell 111a, an outer shell 111b, and an outer shell 111c are collectively referred to as the outer shell 111.

The region 107b may each have a columnar (cylindrical or prismatic) shape or a conical or pyramidal shape (which may also be referred to as needle-like shape). Further, a top of the active material including a plurality of whiskers may be curved.

The longitudinal directions of the active material including a plurality of whiskers do not necessarily have to be the same. When the longitudinal directions of the active material including a whisker are different from each other, in FIGS. 1A and 1B, a transverse cross-sectional shape of the active material (the cross-sectional shape of a portion including the core 109a and the outer shell 111a) is shown as well as a longitudinal cross-sectional shape of the active material (the cross-sectional shape of a portion including the core 109b and the outer shell 111b). In a transverse cross section of the active material including a whisker, the core 109 is observed (is not observed) in the active material including a whisker in some cases depending on a position. Further, the transverse cross section of the active material including a whisker is circular when the active material including a whisker has a cylindrical or conical shape, and is polygonal when the active material including a whisker has a prismatic or pyramidal shape. It is preferable that the longitudinal directions of the active material including a whisker be not the same because one of the active material including a whisker is likely to be entangled with the other, so that separation (or detachment) of the active material including a whisker does not easily occur in charging/discharging.

Note that the direction in which the active material including a whisker is extended from the region 107a is called the longitudinal direction, and the cross-sectional shape of the active material including a whisker cut along the longitudinal direction is called a longitudinal cross-sectional shape. In addition, a cross-sectional shape of the active material including a whisker cut along a surface perpendicular to or substantially perpendicular to the longitudinal direction of the active material including a whisker is called a transverse cross-sectional shape.

The width of the core 109 in a transverse cross-sectional shape is greater than or equal to 0.2 μm and less than or equal to 3 μm, preferably greater than or equal to 0.5 μm and less than or equal to 2 μm.

The length of each of the cores 109 is not particularly limited but may be greater than or equal to 0.5 μm and less than or equal to 1000 μm, preferably greater than or equal to 2.5 μm and less than or equal to 100 μm.

In the region 107b, the width of the transverse cross section of the active material including a plurality of whiskers is greater than or equal to 0.2 μm and less than or equal to 10 μm, preferably greater than or equal to 1 μm and less than or equal to 5 μm. The length of each of the active materials including a plurality of whiskers is greater than or equal to 3 μm and less than or equal to 1000 μm, preferably greater than or equal to 6 μm and less than or equal to 200 μm.

Note that in the longitudinal cross-sectional shape of the active material including a whisker, the "length" of the core 109 and the outer shell 111 refers to the distance between a vertex of the core 109 or the outer shell 111 and the region 107a, in the direction along an axis passing through the center of the vertex (or the top surface) of the active material including a whisker.

Further, the structure of the active material including a plurality of whiskers is not limited to the described-above structure; the whole of the region 107a and the region 107b may have a structure having crystallinity, and the whole of the region 107a and the region 107b may have an amorphous structure (e.g., the outer shell 111c).

In the electrode 100 illustrated in FIG. 1A, part of the region 107a (a region other than the region where the conductive layer 103 is in contact with the core 109) has an amorphous structure like the outer shell 111. Further, the region 107a may include a structure having crystallinity. Furthermore, the region 107a may include one or both of the materials of the conductive layer 103 and a material of the mixed layer 105.

Moreover, in the electrode 100, as illustrated in FIG. 1B, a portion of the region 107a which is in contact with the conductive layer 103 may have a structure having crystallinity like the core 109. Further, the region 107a may include an amorphous structure. Furthermore, the region 107a may include one or both of the materials of the conductive layer 103 and the material of the mixed layer 105.

For example, in the case where the electrode 100 is the mode illustrated in FIG. 1A, adhesion between the conductive layer 103 and the region 107a is higher than in the case where the electrode 100 is the mode illustrated in FIG. 1B. This is because an amorphous structure is more adaptable to the surface of the conductive layer 103, over which the active material is formed. Moreover, in the case where this embodiment is included in the power storage device, the active material is resistant to change in volume due to occlusion and release of ions (e.g., the active material which has an amorphous structure relieves stress caused by change in volume), so that pulverization and separation of the electrode 100 (in particular, the active material including a whisker) due to repeating charge/discharge cycles can be prevented, and a power storage device having much higher cycle characteristics can be manufactured.

Alternatively, in the case where the electrode 100 is the mode illustrated in FIG. 1B, a structure having crystallinity which has higher conductivity and ion mobility is in contact with the conductive layer 103 wider than that in the case where the electrode 100 is the mode illustrated in FIG. 1A. Therefore, as the whole electrode 100, the conductivity can be increased. That is, in the case where this embodiment is included in the power storage device, a power storage device with much higher output characteristics can be manufactured.

In the electrode 100, the surface area of the active material layer 108 is larger than that of a plate-like active material layer due to the projecting region 107b. Moreover, since the graphene 116 is included in the active material layer 108, the surface area of the active material layer 108 is much larger. That is, in the case where the electrode 100 is included in a power storage device, high speed charge/discharge can be performed, so that a power storage device with much higher charge/discharge capacity can be manufactured.

As illustrated in FIGS. 1A and 1B, the active material layer 108 in the electrode 100 includes the graphene 116 which is in contact with the active material including a plurality of whiskers and the graphene 116 includes the first region 113 and the second region 115.

In this specification, graphene refers to a one-atom-thick sheet of carbon molecules having a hole through which ions can pass and $sp^2$ bonds, or a stacked body in which 2 to 100 layers of the sheets are stacked. Note that the stacked body is also referred to as a multilayer graphene. Further, in the graphene, the proportion of the elements except hydrogen and carbon is preferably lower than or equal to 15 atomic %, or the proportion of elements except carbon is preferably lower than or equal to 30 atomic %. This is because an analog of graphene is included in the category of the graphene.

The first region 113 covers each of the active materials including a plurality of whiskers. In detail, the first region 113 also covers a surface of the region 107a as well as a surface of the active material in the projecting region 107b. Further, the thickness of the first region 113 is not uniform in the whole area and may be uneven.

A second region 115 is provided between a first region 113 at a side of one of the active materials including whiskers and at least one of other first regions 113 at a side of an active material. Moreover, the second regions 115 dot the region where the active material including a plurality of whiskers is formed. Therefore, in a plan view of the active material layer 108, there are holes (also referred to as spaces) at intervals (not illustrated) in the active material layer 108. Further, the thickness of the second region 115 is not uniform in the whole area and may be uneven.

Note that in the graphene 116, the interface between the first region 113 and the second region 115 is not clear. In FIGS. 1A and 1B, in a region where the first region 113 is bonded to the second region 115, the first region 113 and the second region 115 are individually illustrated by dotted lines for clarity.

As illustrated in dashed dotted lines in FIGS. 1A and 1B, the second region 115 in the graphene 116 may be provided between a first region 113 at a side of one of the active materials including a whisker and a first region 113 at a surface of the region 107a. The second region 115 illustrated in FIGS. 1A and 1B extends perpendicularly to the substrate 101; however, the second region 115 is not limited thereto and may be a long and narrow string shape which is attached to a first region 113 at a side of one of the active materials including a whisker (not illustrated).

Further, the active material layer 108 may have a structure in which an oxide film is provided between the first region 113 and the active material including a plurality of whiskers. However, in the terms of conductivity of the electrode 100, the oxide film is preferably not provided.

The graphene 116 is highly flexible and in contact with the active material including a plurality of whiskers. Therefore, in the electrode 100 in which the graphene 116 is included in the active material layer 108, even if the volume of the active material including a plurality of whiskers is changed due to occlusion and release of ions, the graphene 116 relieves stress caused by the change in volume, so that pulverization and separation of the active material including a whisker due to repeating charge/discharge cycles can be prevented. Moreover, the graphene 116 has high mechanical strength; therefore, bending and collapsing (also pulverization and separation) of the active material including a whisker by physical impact in the electrode 100 including the graphene 116 can be prevented. Therefore, by using the electrode 100, a decrease in charge/discharge capacity by physical impact or repeating charge/discharge cycles can be suppressed, so that a power storage device having higher cycle characteristics can be manufactured.

Further, the graphene 116 has high conductivity (electron mobility) and is in contact with the active material including a plurality of whiskers, whereby in the electrode 100, the graphene 116 can function as a conduction auxiliary agent. That is, the graphene 116 becomes a conduction path of electrons generated due to occlusion and release of ions. This is because the electrode 100 is superior in conductivity. Therefore, by using the electrode 100, high speed charge/discharge can be performed, and a power storage device with higher charge/discharge capacity can be manufactured.

Further, the graphene 116 is in contact with the active material including a plurality of whiskers of the active material layer 108, whereby, for example, even when the active material including a whisker is bent or collapsed (also pulverized and separated), the state where the active material including a whisker are in contact with the graphene 116 is maintained, so that the conduction path of electrons in the electrode 100 is not interrupted and electrons can be collected through the graphene 116. That is, even when the active material including a whisker is bent or collapsed (also pulverized and separated), decrease in conductivity between the conductive layer 103 and the active material layer 108 (consequently conductivity of the electrode 100) can be suppressed.

Further, because the graphene 116 itself has a capacity so that ions can be occluded, the electrode 100 with the graphene 116 functions as an electrode with a higher capacity than the electrode 100 without the graphene 116. Therefore, by using the electrode 100, a power storage device with higher charge/discharge capacity can be manufactured.

Further, in the electrode 100, the graphene 116 is in contact with the active material including a plurality of whiskers, whereby it can be said that the graphene 116 ties the active material including a plurality of whiskers. That is, the graphene 116 also functions as a binder. As described above, the electrode 100 is formed without a known conduction auxiliary agent (such as acetylene black) or a binder. As a result, the electrode 100 can increase the volume or weight proportion of the active material layer 108 in the electrode, so that the electrode 100 functions as an electrode with high capacity. Therefore, using the electrode 100, a power storage device with higher charge/discharge capacity can be manufactured.

Further, the graphene 116 also has high heat resistance. Therefore, in the electrode 100, the concentration of moisture in the electrode can be reduced by heat treatment. Moreover, in the case where the electrode 100 is included in the power storage device, the graphene 116 of the electrode 100 is less capable of absorbing an electrolyte, so that deformation or breakdown of the electrode 100 due to swelling of the graphene 116 hardly occurs.

<Method for Manufacturing Electrode 100>

Next, a method for manufacturing the electrode 100 according to one embodiment of the present invention will be described.

The conductive layer 103 is formed over the substrate 101. The conductive layer 103 can be formed using a conductive material and a method such as a printing method, a sol-gel method, a coating method, an ink-jet method, a CVD method, a sputtering method, or an evaporation method as appropriate. In addition, the conductive layer 103 may be formed in a foil shape, a plate shape, a net shape, or the like. Note that in the case where the conductive layer 103 has a foil shape or a plate shape, it is not necessary to provide the substrate 101. Further, the conductive layer 103 can be formed through roll-to-roll processing.

As described below, depending on the formation conditions of the active material layer 108, the mixed layer 105 may be formed on a part of the surface layer or the whole of the surface layer of the conductive layer 103 in some cases.

Further, over the substrate 101, the conductive layer 103 may have a stacked layer which includes a layer formed using a metal material having high conductivity typified by an aluminum alloy and the like to which an element which improves heat resistance is added; and over the layer, a layer formed using a metal material which forms the mixed layer 105. Note that as the element which improves heat resistance, for example, platinum, aluminum, copper, silicon, titanium, neodymium, scandium, molybdenum, or the like can be used.

Next, the active material layer 108 is formed over the conductive layer 103. First, the active material including a plurality of whiskers is formed. There is no particular limitation on a material of the active material including a plurality of whiskers as long as it can be formed like the plurality of whiskers and it can occlude and release ions. For example, silicon can be used as the material, and in this embodiment, a method for manufacturing the electrode 100 in the case where silicon is used as the material is described.

The active material including a plurality of whiskers s can be formed by an LPCVD (low pressure CVD) method. Here, the active material including a plurality of whiskers is preferably formed at a temperature higher than 400° C. and lower than or equal to a temperature which an LPCVD apparatus, the substrate 101, and the conductive layer 103 can withstand, and preferably higher than or equal to 500° C. and lower than 580° C. Note that in the case of the mode illustrated in FIG. 1A, the upper limit of the temperature range is set to be less than temperatures at which silicon of the active material including a plurality of whiskers does not become amorphous.

In the case where the active material including a plurality of whiskers is formed, as a source gas, a deposition gas containing silicon is used. As the deposition gas containing silicon, a gas containing silicon hydride, silicon fluoride or silicon chloride can be used. Specifically, $SiH_4$, $Si_2H_6$, $SiF_4$, $SiCl_4$, $Si_2Cl_6$, or the like can be used. Note that one or more of a hydrogen gas and rare gases such as helium, neon, argon, and xenon may be contained in the source gas.

Furthermore, in the formation of the active material including a plurality of whiskers, the pressure is set to be higher than or equal to 10 Pa and lower than or equal to 1000 Pa, preferably higher than or equal to 20 Pa and lower than or equal to 200 Pa. However, in the case of the embodiment illustrated in FIG. 1A, the pressure is set to within the range in which silicon in the active material including a plurality of whiskers has an amorphous structure, and in the case of the embodiment illustrated in FIG. 1B, the pressure falls within the range in which silicon in the active material including a plurality of whiskers has a structure having crystallinity.

Further, when the flow rate of the deposition gas containing silicon is high, the deposition rate becomes high, so that silicon of the active material including a plurality of whiskers is likely to have an amorphous structure. When the flow rate of the deposition gas containing silicon is low, the deposition rate becomes low, so that silicon of the active material including a plurality of whiskers is likely to have a structure having crystallinity. Thus, the flow rate of the deposition gas containing silicon may be appropriately determined in consideration of the deposition rate and the like. For example, the flow rate of the deposition gas containing silicon may be greater than or equal to 300 sccm and less than or equal to 1000 sccm.

When the source gas contains phosphine or diborane, the active material including a plurality of whiskers can contain an impurity element imparting one conductivity type (e.g., phosphorus or boron). When the active material including a plurality of whiskers contains an impurity element imparting one conductivity type, the conductivity of the electrode 100 can be increased, so that a power storage device in which charge/discharge capacity is increased can be manufactured.

Further, the embodiment illustrated in FIG. 1B can be easily manufactured by performing the formation of the active materials by an LPCVD method in two installments. After an active material is formed once, heat treatment is performed, and the other active material is formed after the heat treatment. By the heat treatment, the whole region of the region 107a can have a structure having crystallinity. Note that the formation conditions of the active material is as described-above, the heat treatment may be performed in the temperature range in the formation conditions of the active material, preferably performed in the state where the source gas is not supplied.

Here, in the case where the mixed layer 105 is formed, the material of the active material including a plurality of whiskers is silicon, whereby silicide is formed in the mixed layer 105.

The mixed layer 105 is formed in such a manner that active species in the source gas (e.g., radicals which are derived from the deposition gas, or hydrogen radicals) are supplied to a surface of the conductive layer 103, so that silicon is diffused into the conductive layer 103 from the active material including a plurality of whiskers. As the metal material which forms silicide, titanium, zirconium, hafnium, vanadium, niobium, tantalum, chromium, molybdenum, cobalt, nickel, or the like can be used. Thus, as the material of the conductive layer 103, the metal materials listed above can be used.

Note that the conductive layer 103 (or the mixed layer 105) may have an uneven shape in advance. In this manner, formation density of the active material including a plurality of whiskers (in particular, the region 107b) per unit area can be increased. In order that the conductive layer 103 can have an uneven shape, the conductive layer 103 may be subjected to a photolithography process and an etching step. Further, when the conductive layer 103 is formed thin (to a thickness of approximately 2 nm to 100 nm for example), the conductive layer 103 can have an uneven shape reflecting roughness of a surface (the substrate 101) over which the conductive layer 103 is formed.

Note that, in some cases, a metal oxide layer (not illustrated) formed of an oxide of a metal material contained in the conductive layer 103 is formed over the conductive layer 103. This is because oxygen is released from a sidewall of a quartz reaction chamber of the LPCVD apparatus due to the heating in forming the active material including a plurality of whiskers by an LPCVD method and the conductive layer 103 is oxidized. At this time, the reaction chamber may be filled with a rare gas such as helium, neon, argon, xenon or the like, whereby the formation of the metal oxide layer can be suppressed. Also in the case where the mixed layer 105 is formed, a metal oxide layer formed of an oxide of a metal material contained in the mixed layer 105 is formed on the mixed layer 105 in some cases for the above reason. Note that the metal oxide layer may be formed on the surface of the conductive layer 103 before formation of the mixed layer 105.

Examples of the above metal oxide layer include zirconium oxide, titanium oxide, hafnium oxide, vanadium oxide, niobium oxide, tantalum oxide, chromium oxide, molybdenum oxide, tungsten oxide, cobalt oxide, nickel oxide, and the like. When the conductive layer 103 is formed using titanium, zirconium, niobium, tungsten, or the like, the metal oxide layer contains an oxide semiconductor such as titanium oxide, zirconium oxide, niobium oxide, or tungsten oxide; therefore, it is possible to reduce at least one of resistance (also referred to as contact resistance) between the conductive layer 103 and the mixed layer 105 and resistance between the conductive layer 103 (or the mixed layer 105) and the active material including a plurality of whiskers, so that the conductivity of the electrode 100 can be increased.

With the LPCVD method, ions and electrons transfer easily at the interface between the conductive layer 103 and the active material layer 108 (in particular, the region 107a) and the adhesion can be increased. In addition, throughput can be improved.

Next, the graphene 116 which is in contact with the active material including a plurality of whiskers is formed.

First, a graphite oxide solution in which graphite oxide obtained by oxidizing graphite is dispersed is prepared. In this embodiment, the graphite oxide is formed by an oxidation method called a Hummers method. The Hummers method is as follows. A sulfuric acid solution of potassium permanganate or the like is mixed into graphite powder to cause oxidation reaction; thus, a graphite oxide solution is formed. Graphite oxide contains a functional group such as an epoxy group, a carbonyl group, a carboxyl group, or a hydroxyl group due to oxidation of carbon in graphite. Accordingly, the interlayer distance of graphite oxide is longer than that of graphite. Then, ultrasonic vibration is transferred to the graphite oxide solution, so that the graphite oxide whose interlayer distance is long can be cleaved to give the solution in which the graphene oxide is dispersed (a graphene oxide solution), and the solvent is removed, whereby the graphene oxide is obtained.

Graphene oxide is dispersed in a solvent such as water or N-methylpyrrolidone (NMP), so that the graphene oxide solution is obtained. The solvent is preferably a polar solvent. The concentration of graphene oxide may be 0.1 g to 10 g per liter. In a solution having polarity, different graphene oxides are easily dispersed each other because these substituents have high polarity, in particular, graphene oxide contains an epoxy group, a carbonyl group, a carboxyl group, a hydroxyl group, or the like. Further, a solution in which commercial graphene oxide is dispersed in a solvent or a commercial graphene oxide solution can be used. The length of one side (also referred to as a flake size) of graphene oxide which is used may be preferably less than or equal to 10 μm.

Next, the graphene oxide solution is applied to the active material including a plurality of whiskers. As a method of applying the graphene oxide solution to the active material including a plurality of whiskers, a coating method, a spin coating method, a dip coating method, a spray method, an electrophoresis method, or the like may be employed. Alternatively, these methods may be combined as appropriate to be employed. For example, after the graphene oxide solution is applied to a base by a dip coating method, the base is rotated as in a spin coating method, so that the evenness of the thickness of the graphene oxide solution can be improved.

Thus, in the case where an active material having a complex curved surface or unevenness such as the active material including a plurality of whiskers is provided with the graphene oxide, an electrophoresis method is preferably used. Here, the case of using an electrophoresis method will be described below.

FIG. 2 is a cross-sectional view illustrating an electrophoresis method. In a container 201, the solution in which graphene oxide is dispersed and which is obtained by the above method (hereinafter, referred to as a graphene oxide solution 202) is contained. Further, a formation subject 203 is put in the graphene oxide solution 202 and is used as an anode. In addition, a conductor 204 serving as a cathode is put in the graphene oxide solution 202. Note that the formation subject 203 refers to the active material including a plurality of whiskers including the substrate 101 and the conductive layer 103. Further, the conductor 204 may be formed using a conductive material, for example, any of the metal materials and the alloy materials.

By applying appropriate voltage (e.g., 0.5 V to 20 V) between the anode and the cathode, a graphene oxide layer is formed over a surface of the formation subject 203, that is, the surface of the active material including a plurality of whiskers. This is because the graphene oxide is negatively charged in the polar solvent as described above, so that by applying voltage, the graphene oxide which is negatively charged is drawn to the anode and deposited on the formation subject 203. Note that the voltage which is applied is not necessarily constant. Further, by measuring the amount of charge flowing between the anode and the cathode, the thickness of a graphene oxide layer deposited on the object can be estimated.

When the graphene oxide layer with a necessary thickness is obtained, the formation subject 203 is taken out of the graphene oxide solution 202 and dried.

When a graphene oxide layer is formed on the surface of the formation subject 203 by an electrophoresis method, graphene oxide is hardly stacked over a portion of the formation subject 203, which is already covered with graphene oxide, due to sufficiently low conductivity of graphene oxide. However, the graphene oxide is stacked preferentially over a portion which is not yet covered with graphene oxide, whereby the thickness of the graphene oxide formed over the surface of the formation subject 203 is substantially uniform. Note that the graphene oxide formed over the surface of the formation subject 203 becomes the first region 113 of the electrode 100 by reduction treatment described below.

Moreover, when electrophoresis is performed for a longer time than time required for covering the surface of the formation subject 203 with graphene oxide, the graphene oxide which has already covered the surface of the formation subject 203 and other graphene oxide which is dispersed in the graphene oxide solution 202 repel each other. As a result, the graphene oxide is not extended and does not grow so as to cover the surface of the active material including a plurality of whiskers, but the graphene oxide is extended and grows like the second region 115 of the electrode 100. That is, the graphene oxide is formed between a first region 113 at a side of one of the active materials including whiskers and another or other first regions 113 at a side of an active material. The graphene oxide which is extended and grows becomes the second region 115 of the electrode 100 by reduction treatment described below.

Time for performing electrophoresis (time for applying voltage) is preferably longer than time for covering the surface of the formation subject 203 with the graphene oxide, for example, longer than or equal to 0.5 minutes and shorter than or equal to 30 minutes, more preferably longer than or equal to 5 minutes and shorter than or equal to 20 minutes.

Then, part of oxygen is released from the graphene oxide by reduction treatment. As reduction treatment, the graphene oxide is heated at 150° C. or higher, preferably 200° C. or higher in a vacuum, in the air, or in a reducing atmosphere such as an inert gas (nitrogen, a rare gas, or the like) atmosphere. By being heated at a higher temperature and for a longer time, graphene oxide is reduced to a higher extent so that graphene 116 with high purity (i.e., with a low concentration of elements other than carbon) can be obtained. The temperature for heating has to be determined in consideration of reactivity between the graphene oxide and the formation subject 203. Note that graphene oxide is known to be reduced at 150° C.

Further, when heat treatment is performed at a higher temperature and for a longer time, more defects are repaired and the conductivity is improved. From the inventors' measurements, for example, the graphene oxide over a glass substrate is heated and reduced to be graphene, so that resistivity of the graphene is approximately 240 MΩcm at a heating temperature of 100° C. (for one hour), approximately 4 kΩcm at a heating temperature of 200° C. (for one hour), and approximately 2.8 Ωcm at a heating temperature of 300° C. (for one hour). Note that each resistivity is an average value of eight samples measured by the Van der Pauw method.

Since graphite is treated with a sulfuric acid solution of potassium permanganate according to the Hummers method, a functional group such as a sulfone group is also bonded to the graphite oxide, and the release (decomposition) of the functional group is performed at higher than or equal to 200° C. and lower than or equal to 300° C., preferably higher than or equal to 200° C. and lower than or equal to 250° C. Therefore, reduction treatment is preferably performed at higher than or equal to 200° C.

Depending on the temperature of reduction treatment, the conductivity of the graphene changes as described above; the same can also apply to its flexibility, strength, and the like. The temperature of the reduction treatment may be determined in accordance with the required conductivity, flexibility, strength, and the like. In the case where the conductivity of graphene used as a binder is not sufficiently high, a known conduction auxiliary agent (such as acetylene black) is preferably added at a required amount so as to compensate the conductivity.

Through the above reduction treatment, the formed graphene oxide becomes the graphene 116. At that time, in the graphene 116, adjacent graphenes are bonded to form a larger net-like or sheet-like network, so that the first region 113 and the second region 115 are formed. In particular, the first region 113 is formed with a substantially uniform thickness even at the surface of the active material having a complex curved surface or unevenness. Further, graphene oxide having an extremely high flake aspect ratio forms the second region 115 having a long and narrow string shape through the above reduction treatment.

Therefore, the first region 113 is in contact with the second region 115 in any range of the active material layer 108, and holes (also referred to as spaces) at intervals in the active material including a plurality of whiskers are formed in the plan view of the active material layer 108.

Further, the second region 115 of the electrode 100 can be formed by only a dip coating method. However, with a dip coating method, the active material with the surface having a complex curved surface or unevenness may fail to be efficiently soaked in the graphene oxide solution. Thus, after the first region 113 is formed by performing the above electrophoresis method for a short time (e.g., about 0.5 minutes), a dip coating method is performed, whereby the electrode 100 can be manufactured more efficiently than the case of only a dip coating method is performed.

Through the above steps, the active material layer 108 can be formed. It is preferable that steps from the step of forming the active material including a plurality of whiskers to the step of forming the graphene 116 (in particular, the step of forming the graphene oxide) be performed in an atmosphere in which the surface of the active material including a plurality of whiskers is not oxidized. This is because the oxide film may be formed between the active materials including a plurality of whiskers and the first region 113 and decreases the conductivity of the electrode 100.

Through the above steps, an electrode for a power storage device with good cycle characteristics and high charge/discharge capacity can be manufactured.

Although the electrode according to one embodiment of the present invention is shown as the electrode for a power storage device in the above, the electrode according to one embodiment of the present invention may be used for another application. For example, an active material layer of the electrode may be used for a photoelectric conversion layer of a photoelectric conversion device, and the active material layer may be used for an antireflective film.

This embodiment can be implemented in appropriate combination with any of the other embodiments and examples.

Embodiment 2

In this embodiment, an electrode according to an embodiment of the present invention, which is partly different from the electrode described in Embodiment 1, will be described with reference to the drawings.

In an electrode 200 described in this embodiment, the shape of graphene provided in the electrode is different from the electrode 100 described in Embodiment 1. In this embodiment, as numerals using for describing the electrode 200, those used for describing the electrode 100 are used as appropriate.

Figure 10A:
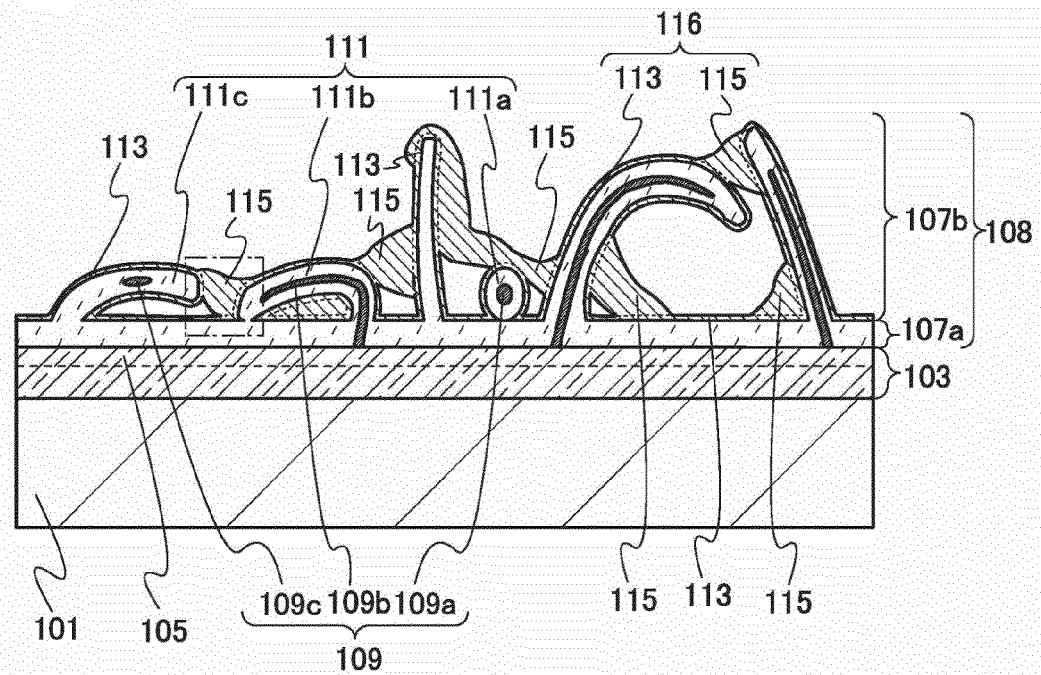
FIGS. 10A and 10B are schematic cross-sectional views each illustrating a surface of an electrode for a power storage device according to one embodiment of the present invention.
Figure 10B:
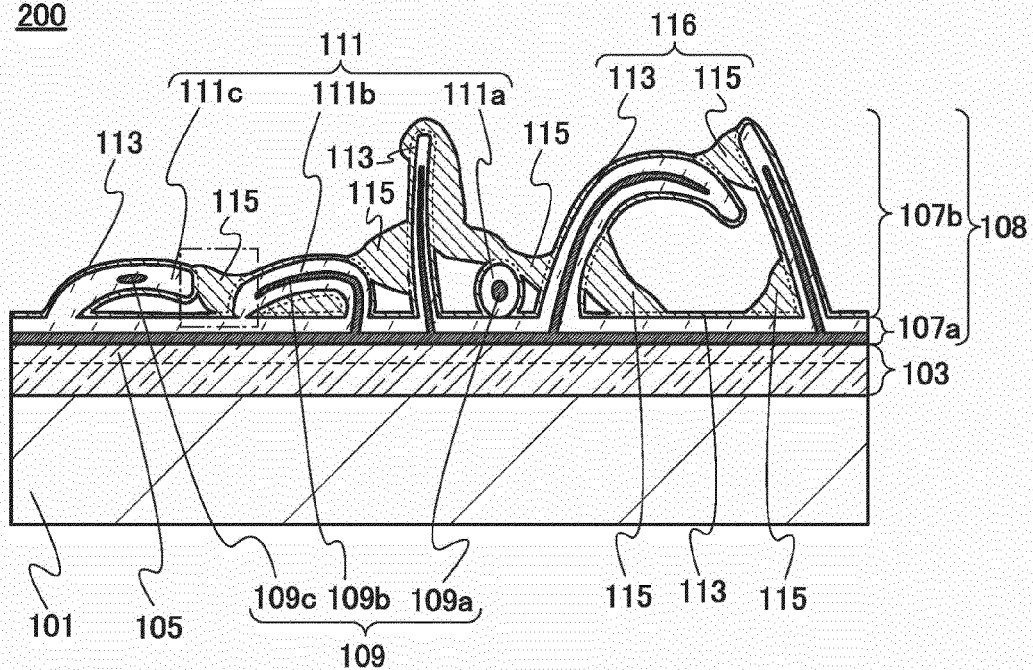

FIGS. 10A and 10B are schematic cross-sectional views of the electrode 200 described in this embodiment. The electrode 200 includes a substrate 101, a conductive layer 103 provided over the substrate 101, and an active material layer 108 provided over the conductive layer 103, like the electrode 100 described in Embodiment 1.

The active material layer 108 includes an active material including a plurality of whiskers including a region 107a and a region 107b, and graphene 116 including a first region 113 and a second region 115 and being in contact with the active material including a plurality of whiskers like the electrode 100 described in Embodiment 1.

The region 107a is provided in contact with the conductive layer 103 and the region 107b projects from the region 107a and provided to be dispersed at random. Therefore, the active material layer 108 has a fine surface structure reflecting the shapes of the active material including a plurality of whiskers.

In a manner similar to that of the electrode 100, a mixed layer 105 may be provided in a part of or the whole of a surface layer of the conductive layer 103 of the electrode 200 by reaction with the active material layer 108 (in particular, the active material including a plurality of whiskers).

In a manner similar to that of the electrode 100, in the active material layer 108 of the electrode 200, the active material including a plurality of whiskers preferably includes a core 109 which has a structure having crystallinity and an outer shell 111 which has an amorphous structure.

The structure having crystallinity has an excellent conductivity and ion mobility and has a feature of high speeds of occlusion and release of ions per unit mass. The amorphous structure has a feature of resistance to change in volume due to occlusion and release of ions (e.g., stress caused by change in volume is relieved).

Therefore, by using the electrode 200 including the active material including a plurality of whiskers including the core 109 and the outer shell 111, output characteristics are improved, and a power storage device with high charge/discharge capacity and improved cycle characteristics can be manufactured.

In the active material layer 108 of the electrode 200, the structures of the core 109 and the outer shell 111 are similar to those of the electrode 100.

Further, in the electrode 200, the details of the active material including a plurality of whiskers are the same as the electrode 100. For example, the details of the core and the outer shell, and a longitudinal cross-sectional shape and a transverse cross-sectional shape of the electrode 200 and the like are similar to those of the electrode 100.

As illustrated in FIG. 10A, part of the region 107a (a region other than the region where the conductive layer 103 is in contact with the core 109) may have an amorphous structure like the outer shell 111. Further, the region 107a may include a structure having crystallinity. Furthermore, the region 107a may include one or both of the materials of the conductive layer 103 and a material of the mixed layer 105.

Moreover, as illustrated in FIG. 10B, a portion of the region 107a which is in contact with the conductive layer 103 may have a structure having crystallinity like the core 109. Further, the region 107a may include an amorphous structure. Furthermore, the region 107a may include one or both of the materials of the conductive layer 103 and the material of the mixed layer 105.

In the case where the electrode 200 is the mode illustrated in FIG. 10A, adhesion between the conductive layer 103 and the region 107a is higher than in the case where the electrode 100 is the mode illustrated in FIG. 10B. Therefore, pulverization and separation of the electrode 200 (in particular, an active material including a whisker) due to repeating charge/discharge cycles can be prevented and a power storage device having much higher cycle characteristics can be manufactured.

Alternatively, in the case where the electrode 200 is the mode illustrated in FIG. 10B, as the whole electrode 200, the conductivity can be increased more than in the case where the electrode 200 is the mode illustrated in FIG. 10A. Therefore, a power storage device with much higher output characteristics can be manufactured.

In the electrode 200, the surface area of the active material layer 108 is larger than that of a plate-like active material layer due to the projecting region 107b. Moreover, since the graphene 116 is included in the active material layer 108, the surface area of the active material layer 108 is much larger. That is, in the case where the electrode 200 is included in a power storage device, high speed charge/discharge can be performed, so that a power storage device with much higher charge/discharge capacity can be manufactured.

In the electrode 200, the active material layer 108 includes the graphene 116 which is in contact with the active material including a plurality of whiskers and the graphene 116 includes the first region 113 and the second region 115. The first region 113 covers each of the active materials including a plurality of whiskers. In detail, the first region 113 also covers the surface of the region 107a as well as the surface of the active material in the projecting region 107b. Further, the thickness of the first region 113 is not uniform in the whole area and may be uneven.

A second region 115 is provided between a first region 113 at a top of one of active materials and another or other first regions 113 at a side or a top of an active material. In addition, the first region 113 is in contact with the second region 115 in any whole range of the active material layer 108, so that in a plan view of the active material layer 108 (not illustrated), the graphene 116 is provided to spread continuously over the active material including a plurality of whiskers. In other words, the graphene 116 is spread uniformly in the planar direction of the active material layer 108 (the active material including a plurality of whiskers) and in contact with the active material including a plurality of whiskers. Note that in this specification, the top refers to a region of an active material including a whisker including at least a vertex and a top surface in the region 107b. That is, the top includes at least a region including a side of the active material including a whisker. Further, the thickness of the second region 115 is not uniform in the whole area and may be uneven.

Note that in the graphene 116 of the electrode 200, the interface between the first region 113 and the second region 115 is not clear. In FIGS. 10A and 10B, in a region where the first region 113 is bonded to the second region 115, the first region 113 and the second region 115 is individually illustrated by dotted lines for clarity.

As illustrated in dashed dotted lines in FIGS. 10A and 10B, the second region 115 in the graphene 116 may be provided between a first region 113 at a side of one of the active materials including a whisker and a first region 113 at a surface of the region 107a.

Further, the active material layer 108 may have a structure in which an oxide film is provided between the first region 113 and the active material including a plurality of whiskers. However, in the terms of conductivity of the electrode 200, the oxide film is preferably not provided.

The graphene 116 is highly flexible and in contact with the active material including a plurality of whiskers, so that pulverization and separation of the active material including a whisker due to repeating charge/discharge cycles can be prevented. Moreover, the graphene 116 has high mechanical strength; therefore, bending and collapsing (also pulverization and separation) of the active material including a whisker by physical impact in the electrode 200 including the graphene 116 can be prevented. Therefore, by using the electrode 200, high speed charge/discharge can be performed, and a power storage device with higher charge/discharge capacity can be manufactured.

In the electrode 200, the graphene 116 is spread uniformly in the planar direction of the active material layer 108 (the active material including a plurality of whiskers) and in contact with the active material including a plurality of whiskers, whereby a region where the graphene 116 is in contact with the active material including a plurality of whiskers is large, so that decrease of the conductivity of the active material layer can be suppressed. Therefore, by using the electrode 200, a decrease in charge/discharge capacity by physical impact or by repetition of charge/discharge cycles can be suppressed, so that a power storage device having higher cycle characteristics can be manufactured.

In addition, the graphene 116 has a capacity so that ions are occluded, and the capacity of the graphene 116 is increased or decreased depending on the shape (area) of the provided graphene 116. For example, in the case where the area is spread uniformly in the planar direction of the active material layer 108 (see FIGS. 10A and 10B), the area and the capacity of the graphene 116 in the plan view of the active material layer 108 are larger than those in the case where holes (also referred to as spaces) at intervals in the active material layer 108 are formed (see FIGS. 1A and 1B). Further, the capacity of the graphene 116 is increased or decreased also depending on its thickness. The thickness of the graphene 116 in the case where the graphene 116 is spread uniformly in the planar direction of the active material layer 108 (the active material including a plurality of whiskers) (FIGS. 10A and 10B) is thicker than that in the case where holes in the active material layer 108 are formed. That is, in the case where the graphene 116 is spread uniformly in the planar direction of the active material layer 108 (the active material including a plurality of whiskers), a capacity of the electrode is increased by at least the capacity of the graphene 116. Therefore, by using the electrode 200, a power storage device with higher charge/discharge capacity can be manufactured.

Further, in the electrode 200, it can be said that the graphene 116 ties the active material including a plurality of whiskers. That is, the graphene 116 also functions as a binder, and the electrode 200 is formed without a known conduction auxiliary agent (such as acetylene black) or a binder. As a result, the electrode 200 can increase the volume or weight proportion of the active material layer 108 in the electrode, so that the electrode 200 functions as an electrode with high capacity. Therefore, using the electrode 200, a power storage device with higher charge/discharge capacity can be manufactured.

Further, the graphene 116 also has high heat resistance, and the concentration of moisture in the electrode 200 can be reduced by heat treatment. Moreover, in the case where the electrode 200 is included in the power storage device, the graphene 116 is less capability of absorbing an electrolyte, so that deformation or breakdown of the electrode 200 due to swelling of the graphene 116 hardly occurs.

The electrode 200 can be manufactured using a manufacturing method which is similar to that of the electrode 100 described in Embodiment 1.

Note that the electrode described in this embodiment may be used for another application. For example, the active material layer may be used for a photoelectric conversion layer of a photoelectric conversion device, and the active material layer may be used for an antireflective film.

This embodiment can be implemented in appropriate combination with any of the other embodiments and examples.

Embodiment 3

In this embodiment, a power storage device according to one embodiment of the present invention will be described.

The power storage device according to one embodiment of the present invention includes at least a positive electrode, a negative electrode, a separator, and an electrolyte solution, and the electrode described in Embodiment 1 is included in the negative electrode.

The electrolyte is a nonaqueous solution containing an electrolyte salt or a solution containing an electrolyte salt. Any electrolyte salt can be used as the electrolyte salt as long as it contains carrier ions such as alkali metal ions, alkaline earth metal ions, beryllium ions, or magnesium ions. Examples of the alkali metal ions include lithium ions, sodium ions, and potassium ions. Examples of the alkaline earth metal ions include calcium ions, strontium ions, and barium ions. In this embodiment, an electrolyte salt containing lithium ions (hereinafter referred to as a lithium-containing electrolyte salt) is used as the electrolyte salt.

With the above structure, a lithium-ion secondary battery or a lithium-ion capacitor can be formed.

Here, a lithium-ion secondary battery will be described with reference to drawings.

Figure 3A:
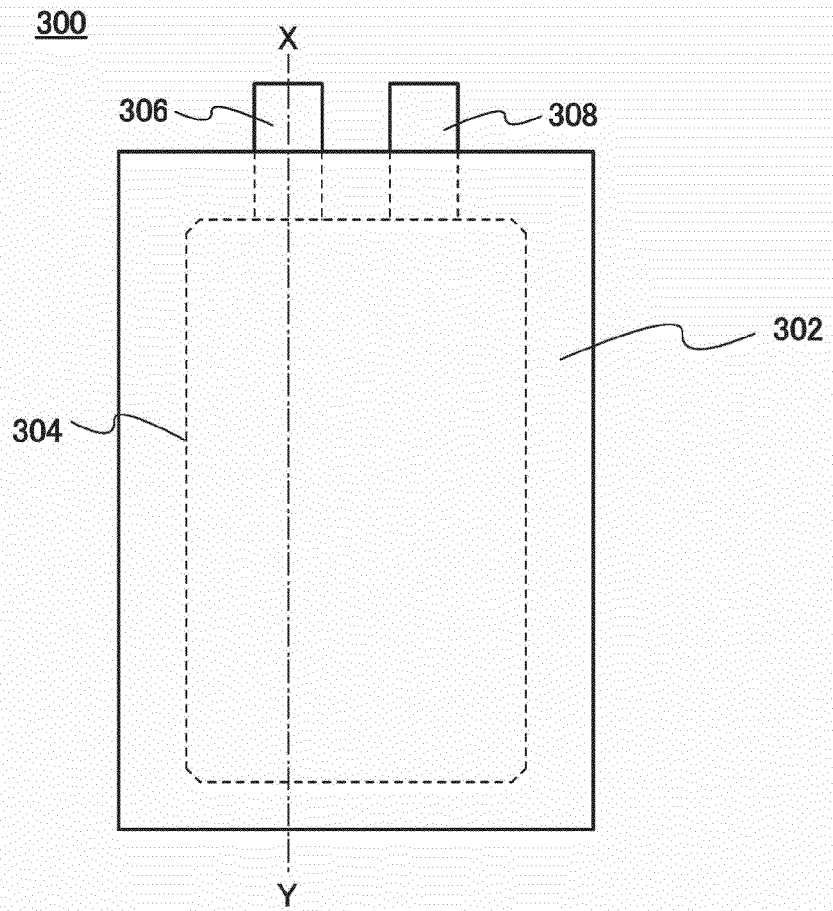
FIGS. 3A and 3B are a plan view and a cross-sectional view illustrating one embodiment of a power storage device.
Figure 3B:
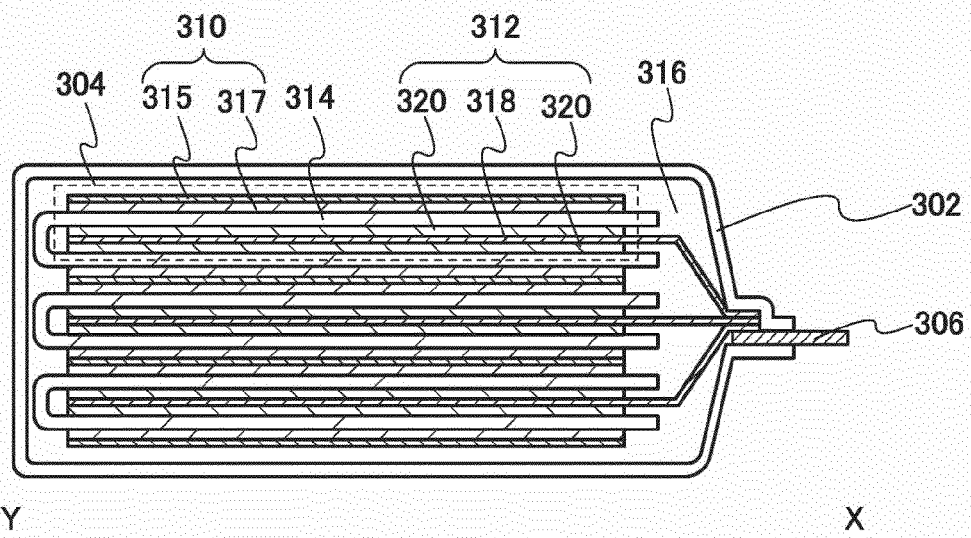

FIG. 3A illustrates a structural example of a power storage device 300. FIG. 3B is a cross-sectional view along dashed dotted line X-Y in FIG. 3A.

The power storage device 300 in FIG. 3A includes a power storage cell 304 in an exterior member 302. The power storage device 300 further includes terminal portions 306 and 308 which are connected to the power storage cell 304. For the exterior member 302, a laminate film, a polymer film, a metal film, a metal case, a plastic case, or the like can be used.

As illustrated in FIG. 3B, the power storage cell 304 includes a negative electrode 310, a positive electrode 312, a separator 314 provided between the negative electrode 310 and the positive electrode 312, and an electrolyte 316 with which a portion almost surrounded with the exterior member 302 is filled.

The negative electrode 310 includes a negative electrode current collector 315 and a negative electrode active material layer 317. The negative electrode active material layer 317 is formed on one or both of the surfaces of the negative electrode current collector 315. Further, the negative electrode current collector 315 is connected to the terminal portion 308, and the terminal portion 308 partly projects outside the exterior material 302.

The positive electrode 312 includes the positive electrode current collector 318 and a positive electrode active material layer 320. The positive electrode active material layer 320 is formed on one surface or opposite surfaces of the positive electrode current collector 318. Further, the positive electrode 312 may include a binder and a conductive additive besides the positive electrode current collector 318 and the positive electrode active material layer 320. A positive electrode current collector 318 is connected to the terminal portion 306. Further, the terminal portions 306 and 308 each partly extend outside the exterior member 302.

Although a sealed thin power storage device is described as the power storage device 300 in this embodiment, the external shape of the power storage device 300 is not limited thereto. A power storage device having any of a variety of shapes, such as a button power storage device, a cylindrical power storage device, or a rectangular power storage device, can be used as the power storage device 300. Further, although the structure where the positive electrode, the negative electrode, and the separator are stacked is described in this embodiment, a structure where the positive electrode, the negative electrode, and the separator are rolled may be employed.

For the positive electrode current collector 318, a conductive material such as aluminum or stainless steel which is processed into a foil shape, a plate shape, a net shape, or the like can be used. Alternatively, a conductive layer provided by deposition separately on a substrate and then separated from the substrate can be used as the positive electrode current collector 318.

The positive electrode active material layer 320 can be formed using any of $LiFeO_2$, $LiCoO_2$, $LiNiO_2$, $LiMn_2O_4$, $LiFePO_4$, $LiCoPO_4$, $LiNiPO_4$, $LiMnPO_4$, $V_2O_5$, $Cr_2O_5$, $MnO_2$, and other lithium compounds as a material. Note that when carrier ions are alkali metal ions other than lithium ions, alkaline earth metal ions, beryllium ions, or magnesium ions, the positive electrode active material layer 320 can be formed using, instead of lithium in the above lithium compounds, an alkali metal (e.g., sodium or potassium), an alkaline earth metal (e.g., calcium, strontium, or barium), beryllium, or magnesium.

The positive electrode active material layer 320 is formed over the positive electrode current collector 318 by a coating method or a physical vapor deposition method (e.g., a sputtering method), whereby the positive electrode 312 can be formed. In the case where a coating method is employed, the positive electrode active material layer 320 is formed in such a manner that a paste in which a conductive additive (for example, acetylene black (AB), a binder (e.g., polyvinylidene fluoride (PVDF))), or the like is mixed with any of the above materials for the positive electrode active material layer 320 is applied to the positive electrode current collector 318 and dried. In this case, the positive electrode active material layer 320 is preferably molded by applying pressure as needed.

Note that as the conductive additive, any electron-conductive material can be used as long as it does not cause a chemical change in the power storage device. For example, a carbon-based material such as graphite or carbon fibers; a metal material such as copper, nickel, aluminum, or silver; or a powder or fiber of a mixture thereof can be used.

As the binder, polysaccharides such as starch, carboxymethyl cellulose, hydroxypropyl cellulose, regenerated cellulose, and diacetyl cellulose; vinyl polymers such as polyvinyl chloride, polyethylene, polypropylene, polyvinyl alcohol, polyvinyl pyrrolidone, polytetrafluoroethylene, polyvinylidene fluoride, ethylene-propylene-diene monomer (EPDM) rubber, sulfonated EPDM rubber, styrene-butadiene rubber, butadiene rubber, and fluorine rubber; polyether such as polyethylene oxide; and the like can be given.

The positive electrode active material layer 320 may be formed using a paste of a mixture of the positive electrode active material and graphene or multilayer graphene instead of a conductive auxiliary agent and a binder. Note that an alkali metal such as potassium may be added to the graphene or the multilayer graphene. Further, the graphene and the multilayer graphene can be obtained by producing the graphene oxide through the Hummers method as described in Embodiment 1 and performing reduction treatment.

The use of graphene or multilayer graphene instead of a conductive additive and a binder leads to a reduction in amount of the conductive additive and the binder in the positive electrode 312. In other words, the weight of the positive electrode 312 can be reduced; accordingly, the charge/discharge capacity of the lithium-ion secondary battery per unit weight of the electrode can be increased.

Strictly speaking, the term "active material" refers only to a material that relates to intercalation and deintercalation of ions functioning as carriers. In this specification, however, in the case of employing a coating method to form the positive electrode active material layer 320, for the sake of convenience, the material of the positive electrode active material layer 320, that is, a substance that is actually a "positive electrode active material," a conductive additive, a binder, and the like are collectively referred to as the positive electrode active material layer 320.

The electrode 100 described in Embodiment 1 or the electrode 200 described in Embodiment 2 can be applied to the negative electrode 310. That is, in the negative electrode 310, the negative electrode current collector 315 corresponds to one of or both the conductive layer 103 and the mixed layer 105, which are described in Embodiment 1 or Embodiment 2, and the negative electrode active material layer 317 corresponds to the active material layer 108, which is described in Embodiment 1 or Embodiment 2. Note that in the electrode 100 illustrated in FIGS. 1A and 1B or the electrode 200 illustrated in FIGS. 10A and 10B, the active material layer 108 is formed on only one surface of the conductive layer 103 which functions as the current collector; however, the structure is not limited thereto, and the active material layer 108 may be formed on both surfaces of the conductive layer 103. For example, when the active material layer is formed using a silicon semiconductor while the negative electrode current collector 315 is held by a frame-like susceptor in an LPCVD apparatus, the active material layers can be formed on both the surfaces of the negative electrode current collector 315 at the same time. As a result, the number of manufacturing steps can be reduced in the case where both the surfaces of the negative electrode current collector 315 are used for formation of the electrode.

The negative electrode active material layer 317 may be predoped with lithium. Predoping with lithium may be performed in such a manner that a lithium layer is formed on a surface of the negative electrode active material layer 317 by a sputtering method. Alternatively, lithium foil is provided on the surface of the negative electrode active material layer 317, whereby the negative electrode active material layer 317 can be predoped with lithium.

The electrolyte 316 is a nonaqueous solution containing an electrolyte salt or a solution containing an electrolyte salt. Particularly in a lithium-ion secondary battery, a lithium-containing electrolyte salt which is carrier ions and comprises lithium ions can transfer and stably exist is used. Typical examples of the electrolyte salt include lithium salts such as $LiClO_4$, $LiAsF_6$, $LiBF_4$, $LiPF_6$, and $Li(C_2F_5SO_2)_2N$. Note that when carrier ions are alkali metal ions other than lithium ions or alkaline earth metal ions, alkali metal salt (e.g., sodium salt or potassium salt), alkaline earth metal salt (e.g., calcium salt, strontium salt or barium salt), beryllium salt, magnesium salt, or the like can be used as a solute of the electrolyte 316.

The electrolyte 316 is preferably a nonaqueous solution containing an electrolyte salt. That is, as a solvent of the electrolyte 316, an aprotic organic solvent is preferably used. Examples of the aprotic organic solvent include ethylene carbonate, propylene carbonate, dimethyl carbonate, diethyl carbonate, γ-butyrolactone, acetonitrile, dimethoxyethane, and tetrahydrofuran, and one or more of these materials can be used. Alternatively, as the aprotic organic solvent, one ionic liquid or a plurality of ionic liquids may be used. Owing to non-flammability and non-volatility of an ionic liquid, it is possible to suppress explosion, inflammation, and the like of the power storage device 300 at the time when the internal temperature of the power storage device 300 rises, resulting in improvement in safety.

When a gelled high-molecular material containing an electrolyte salt is used as the electrolyte 316, safety against liquid leakage and the like is improved and the power storage device 300 can be thinner and more lightweight. Examples of the gelled high-molecular material include a silicon gel, an acrylic gel, an acrylonitrile gel, polyethylene oxide, polypropylene oxide, and a fluorine-based polymer.

As the electrolyte 316, a solid electrolyte such as $Li_3PO_4$ can be used.

As the separator 314, an insulating porous material is used. For example, paper; nonwoven fabric; a glass fiber; ceramics; a synthetic fiber containing nylon (polyamide), vinylon (polyvinyl alcohol based fiber), polyester, acrylic, polyolefin, or polyurethane; or the like may be used. Note that a material which does not dissolve in the electrolyte 316 needs to be selected.

A lithium-ion secondary battery has a small memory effect, a high energy density, and a high charge/discharge capacity. In addition, the output voltage of the lithium ion battery is high. Thus, it is possible to reduce the size and weight of the lithium-ion battery. Further, the lithium ion battery does not easily deteriorate due to repeated charge/discharge cycles and can be used for a long time, leading to a reduction in cost.

In the case where the power storage device according to one embodiment of the present invention is a lithium-ion capacitor, instead of the positive electrode active material layer 320, a material capable of reversibly occluding and releasing one of or both lithium ions and anions may be used. Examples of the material include active carbon, graphite, a conductive high molecule, and a polyacene organic semiconductor (PAS).

High adhesion between a current collector and an active material layer of both positive electrode and negative electrode in a power storage device according to one embodiment of the present invention allows an electrode to be bended. Thus, the power storage device can be flexible.

Note that this embodiment can be implemented in appropriate combination with any of the structures of the other embodiments and example.

Embodiment 4

The power storage device according to one embodiment of the present invention can be used for power supplies of a variety of electric appliances which can be operated with power.

Specific examples of electric appliances each utilizing the power storage device according to one embodiment of the present invention are as follows: display devices, lighting devices, desktop personal computers and laptop personal computers, image reproduction devices which reproduce still images and moving images stored in recording media such as digital versatile discs (DVDs), mobile phones, portable game machines, portable information terminals, e-book readers, video cameras, digital still cameras, high-frequency heating appliances such as microwave ovens, electric rice cookers, electric washing machines, air-conditioning systems such as air conditioners, electric refrigerators, electric freezers, electric refrigerator-freezers, freezers for preserving DNA, and medical electrical equipment such as dialyzers. In addition, moving objects driven by electric motors using power from power storage devices are also included in the category of electric appliances. Examples of the moving objects include electric vehicles, hybrid vehicles each including both an internal-combustion engine and an electric motor, and motorized bicycles including motor-assisted bicycles.

In the electric appliances, the power storage device according to one embodiment of the present invention can be used as a power storage device for supplying enough power for almost the whole power consumption (referred to as a main power supply). Alternatively, in the electric appliances, the power storage device according to one embodiment of the present invention can be used as a power storage device which can supply power to the electric appliances when the supply of power from the main power supply or a commercial power supply is stopped (such a power storage device is referred to as an uninterruptible power supply). Still alternatively, in the electric appliances, the power storage device according to one embodiment of the present invention can be used as a power storage device for supplying power to the electric appliances at the same time as the power supply from the main power supply or a commercial power supply (such a power storage device is referred to as an auxiliary power supply).

Figure 4:
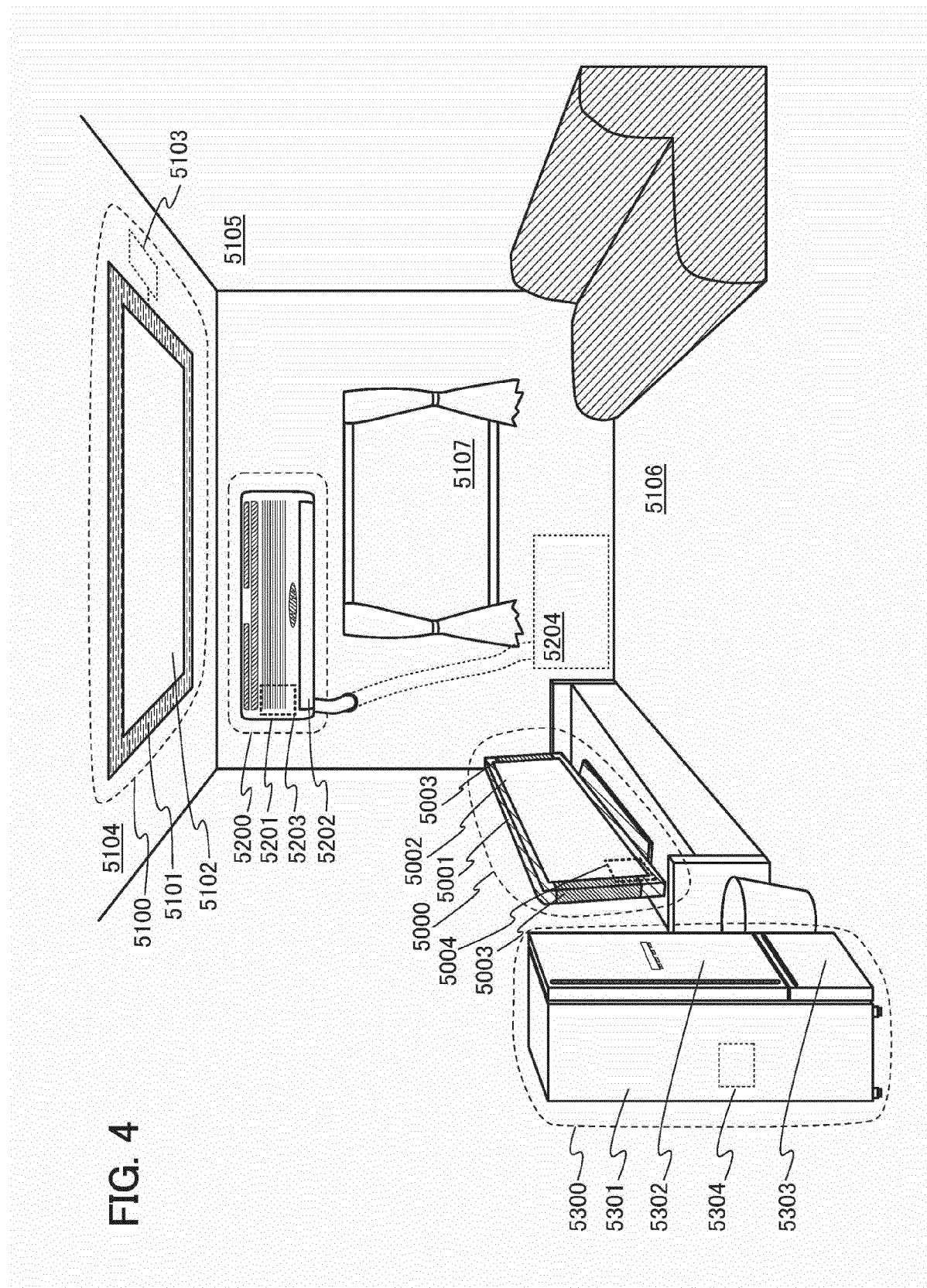
FIG. 4 is a view illustrating application examples of a power storage device.

FIG. 4 illustrates specific structures of the electric appliances. In FIG. 4, a display device 5000 is an example of an electric appliance including a power storage device 5004 according to one embodiment of the present invention. Specifically, the display device 5000 corresponds to a display device for TV broadcast reception and includes a housing 5001, a display portion 5002, speaker portions 5003, and the power storage device 5004. The power storage device 5004 according to one embodiment of the present invention is provided in the housing 5001. The display device 5000 can receive power from a commercial power supply. Alternatively, the display device 5000 can use power stored in the power storage device 5004. Thus, the display device 5000 can be operated with the use of the power storage device 5004 according to one embodiment of the present invention as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 5002.

Note that the display device includes, in its category, all of information display devices for personal computers, advertisement displays, and the like besides TV broadcast reception.

In FIG. 4, an installation lighting device 5100 is an example of an electric appliance including a power storage device 5103 according to one embodiment of the present invention. Specifically, the lighting device 5100 includes a housing 5101, a light source 5102, and a power storage device 5103. Although FIG. 4 illustrates the case where the power storage device 5103 is provided in a ceiling 5104 on which the housing 5101 and the light source 5102 are installed, the power storage device 5103 may be provided in the housing 5101. The lighting device 5100 can receive power from a commercial power supply. Alternatively, the lighting device 5100 can use power stored in the power storage device 5103. Thus, the lighting device 5100 can be operated with the use of the power storage device 5103 according to one embodiment of the present invention as an uninterruptible power supply even when power cannot be supplied from a commercial power supply due to power failure or the like.

Note that although the installation lighting device 5100 provided in the ceiling 5104 is illustrated in FIG. 4 as an example, the power storage device according to one embodiment of the present invention can be used in an installation lighting device provided in, for example, a wall 5105, a floor 5106, a window 5107, or the like other than the ceiling 5104. Alternatively, the power storage device can be used in a tabletop lighting device or the like.

As the light source 5102, an artificial light source which emits light artificially by using power can be used. Specifically, discharge lamps such as an incandescent lamp and a fluorescent lamp, and light-emitting elements such as an LED and an organic EL element are given as examples of the artificial light source.

In FIG. 4, an air conditioner including an indoor unit 5200 and an outdoor unit 5204 is an example of an electric appliance including a power storage device 5203 according to one embodiment of the invention. Specifically, the indoor unit 5200 includes a housing 5201, an air outlet 5202, and a power storage device 5203. Although FIG. 4 illustrates the case where the power storage device 5203 is provided in the indoor unit 5200, the power storage device 5203 may be provided in the outdoor unit 5204. Alternatively, the power storage devices 5203 may be provided in both the indoor unit 5200 and the outdoor unit 5204. The air conditioner can receive power from a commercial power supply. Alternatively, the air conditioner can use power stored in the power storage device 5203. Particularly in the case where the power storage devices 5203 are provided in both the indoor unit 5200 and the outdoor unit 5204, the air conditioner can be operated with the use of the power storage device 5203 according to one embodiment of the present invention as an uninterruptible power supply even when power cannot be supplied from a commercial power supply due to power failure or the like.

Note that although the split-type air conditioner including the indoor unit and the outdoor unit is illustrated in FIG. 4 as an example, the power storage device according to one embodiment of the present invention can be used in an air conditioner in which the functions of an indoor unit and an outdoor unit are integrated in one housing.

In FIG. 4, an electric refrigerator-freezer 5300 is an example of an electric appliance including a power storage device 5304 according to one embodiment of the present invention. Specifically, the electric refrigerator-freezer 5300 includes a housing 5301, a door for a refrigerator 5302, a door for a freezer 5303, and the power storage device 5304. The power storage device 5304 is provided in the housing 5301 in FIG. 4. The electric refrigerator-freezer 5300 can receive power from a commercial power supply. Alternatively, the electric refrigerator-freezer 5300 can use power stored in the power storage device 5304. Thus, the electric refrigerator-freezer 5300 can be operated with the use of the power storage device 5304 according to one embodiment of the present invention as an uninterruptible power supply even when power cannot be supplied from a commercial power supply due to power failure or the like.

Note that among the electric appliances described above, a high-frequency heating apparatus such as a microwave oven and an electric appliance such as an electric rice cooker require high power in a short time. The tripping of a breaker of a commercial power supply in use of an electric appliance can be prevented by using the power storage device according to one embodiment of the present invention as an auxiliary power supply for supplying power which cannot be supplied enough by a commercial power supply.

In addition, in a time period when electric appliances are not used, particularly when the proportion of the amount of power which is actually used to the total amount of power which can be supplied from a commercial power supply source (such a proportion referred to as a usage rate of power) is low, power can be stored in the power storage device, whereby the usage rate of power can be reduced in a time period when the electric appliances are used. For example, in the case of the electric refrigerator-freezer 5300, power can be stored in the power storage device 5304 in night time when the temperature is low and the door for a refrigerator 5302 and the door for a freezer 5303 are not often opened or closed. On the other hand, in daytime when the temperature is high and the door for a refrigerator 5302 and the door for a freezer 5303 are frequently opened and closed, the power storage device 5304 is used as an auxiliary power supply; thus, the usage rate of power in daytime can be reduced.

This embodiment can be implemented in appropriate combination with any of the other embodiments and example.

Example 1

In this example, evaluation results of an electrode which is formed for a power storage device according to one embodiment of the present invention will be described. Note that descriptions in this example will be given using FIGS. 1A and 1B, FIG. 2, and reference numerals in FIGS. 1A and 1B and FIG. 2.

In this example, a titanium sheet (the purity: 99.5%, the thickness: 0.1 mm) was used as the conductive layer 103. Therefore, the substrate 101 was not used in this example. Note that the titanium foil was immersed in a 0.5% hydrofluoric acid solution for 10 minutes, whereby the surface thereof was cleaned.

Next, by using silicon for an active material including a plurality of whiskers, the active material including a plurality of whiskers including a core 109 which is silicon having a structure having crystallinity (hereinafter, referred to as crystalline silicon) and an outer shell 111 which is silicon having an amorphous structure (hereinafter, referred to as amorphous silicon) was formed over the titanium sheet. Note that in this example, as illustrated in FIG. 1A, the active material including a plurality of whiskers whose part of the interface with the titanium sheet was formed of amorphous silicon like the outer shell 111 was formed.

Specifically, the active material including a plurality of whiskers was formed over the titanium sheet by an LPCVD method. The LPCVD method was performed in a reaction chamber into which silane gas ($SiH_4$ gas) and nitrogen gas ($N_2$ gas) were each introduced as a source gas at a flow rate of 300 sccm and in which the pressure was 150 Pa and in which the temperature was 550° C. The reaction chamber made of quartz was used. When the temperature of the titanium sheet was increased, an argon gas was introduced into the reaction chamber.

Next, a solution in which graphene oxide had been dispersed (corresponds to the graphene oxide solution 202 in FIG. 2) was prepared. The solution can be manufactured by forming graphite oxide with a Hummers method and applying ultrasonic vibration to the graphite oxide, as described in Embodiment 1. However, in this example, a graphene oxide aqueous solution (concentration: 0.275 mg/ml, flake size: 0.5 µm to 5 µm) which is commercially available (Graphene Supermarket) was used.

Then, by employing the electrophoresis method described in Embodiment 1, graphene oxide was formed around the active material including a plurality of whiskers. Specifically, a titanium sheet with the active material including a plurality of whiskers was immersed in the graphene oxide solution 202, and a stainless steel plate was immersed therein as an electrode (see FIG. 2). Here, the distance between the titanium sheet and the stainless steel plate was 1 cm. Then, with the sheet used as an anode and the stainless steel plate as a cathode, a voltage of 10 V was applied between the anode and the cathode for 15 minutes. The amount of charge flowing during the 15 minutes was 0.223 C. Note that the active material including a plurality of whiskers with the titanium sheet corresponds to the formation subject 203 in FIG. 2.

After that, the titanium sheet was taken out of the solution, dried, and then heated at 300° C. in a vacuum (0.1 Pa or less) for 10 hours. A sample formed through the above steps was used as Electrode A.

Figure 5A:
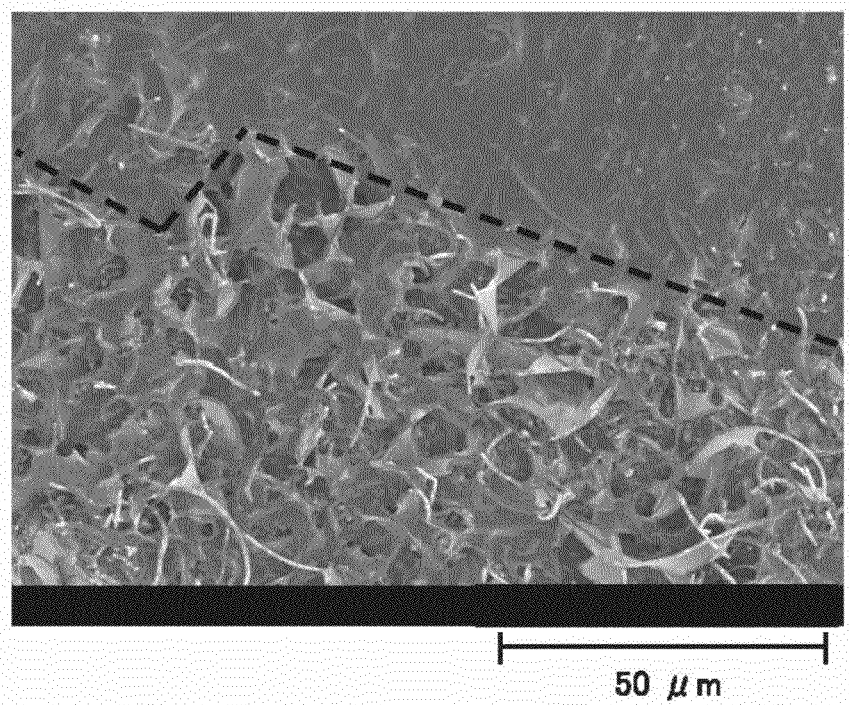
FIGS. 5A and 5B are plan SEM images of a surface of an electrode for a power storage device according to one embodiment of the present invention.
Figure 5B:
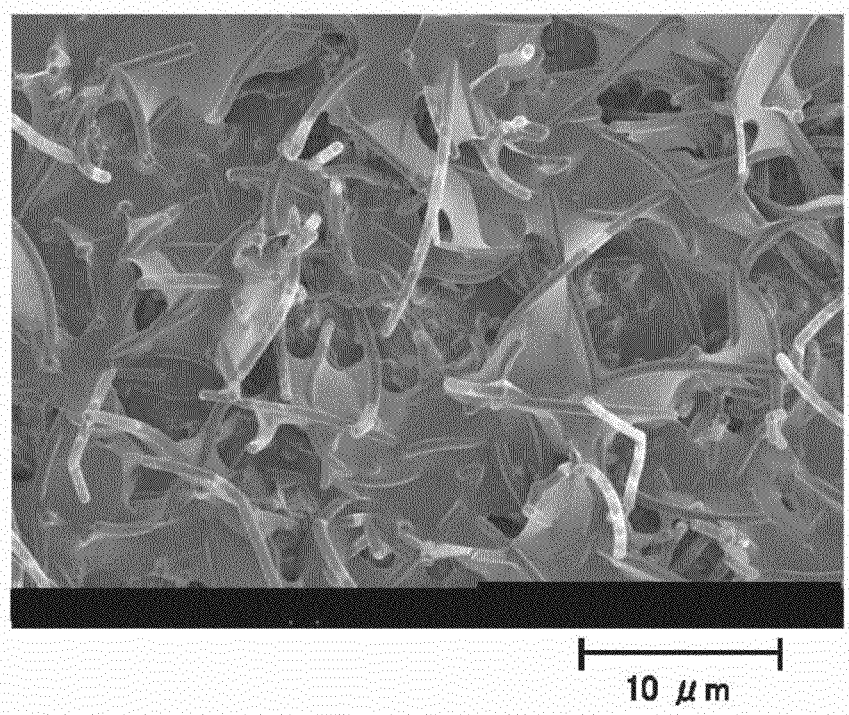

A part of a surface of Electrode A was observed. FIGS. 5A and 5B are planar scanning electron microscope (SEM) image of the part. The magnifications of the images in FIGS. 5A and 5B are 1000 times and 3000 times, respectively.

As seen in FIGS. 5A and 5B, Electrode A has an active material including a plurality of whiskers over the titanium sheet. The tops of some of the active materials including a whisker are curved. The longitudinal directions of the active materials including a whisker are not the same.

In addition, peaks of a D band and a G band, which are derived from graphene, were observed in any portion of the active materials including a whisker measured by Raman spectroscopy. This indicates that substantially the surface of the active material including a plurality of whiskers is probably covered with graphene (corresponds to the first region 113 in FIGS. 1A and 1B).

In Electrode A, graphene which corresponds to the second region 115 (the electrode 100) in FIGS. 1A and 1B was found. In particular, graphene was observed noticeably in a region below a dotted line portion in FIG. 5A. In the region, the graphene was formed between a first region 113 at a side of one of the active materials including a whisker and another or other first regions 113 at a side of an active material.

Further, the second region 115 was dotted in a range of the active material including a plurality of whiskers. That is, there was also an active material which does not include the second region 115. Therefore, in Electrode A, holes (also referred to as spaces) were found at intervals in the active material layer 108.

Figure 6A:
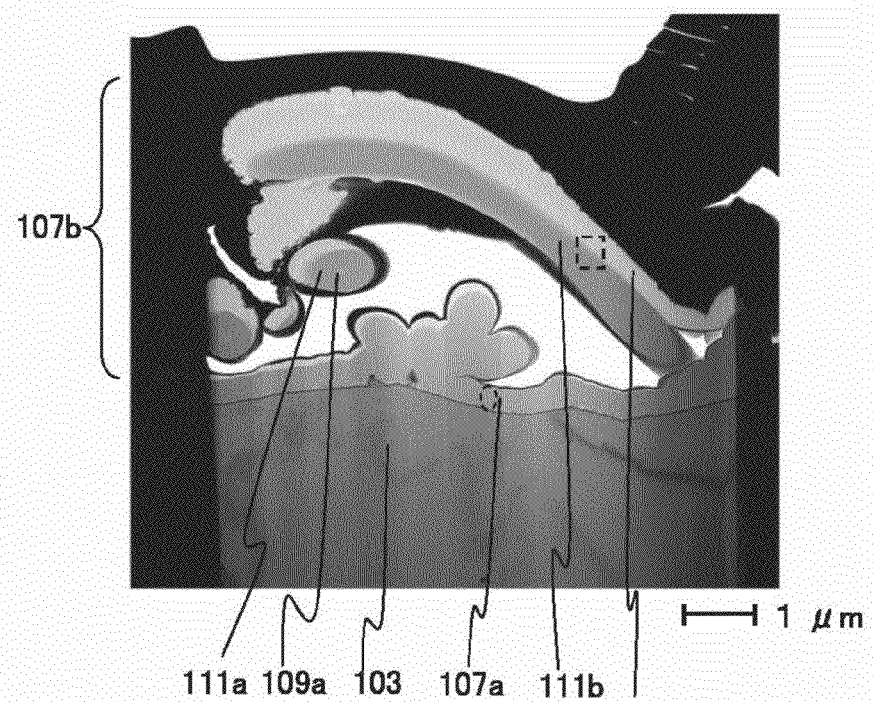
FIGS. 6A and 6B are cross-sectional TEM images of a surface of an electrode for a power storage device according to one embodiment of the present invention.

Next, cross-sectional transmission electron microscope (TEM) image of the part of Electrode A is shown (see FIG. 6A). The magnification of the image in FIG. 6A is 20500 times.

As seen in FIG. 6A, in Electrode A, an active material including a plurality of whiskers which corresponds to the region 107a and the region 107b in FIG. 1A is formed over the titanium sheet (the conductive layer 103). Note that in FIGS. 6A and 6B, a region which corresponds to the region 107a of FIG. 1A is represented as a region 107a. In addition, a carbon film which had been deposited by evaporation treatment in the observation was formed around the active material including a plurality of whiskers.

Moreover, it is found that the region 107a in FIG. 6A has an amorphous structure. The active material including a plurality of whiskers includes a core having a structure having crystallinity (corresponds to the core 109a in FIG. 1A) and an outer shell having an amorphous structure (corresponds to the outer shell 111a in FIG. 1A). Note that the differences of a structure having crystallinity and an amorphous structure can be expressed by a contrast in FIG. 6A.

Figure 6B:
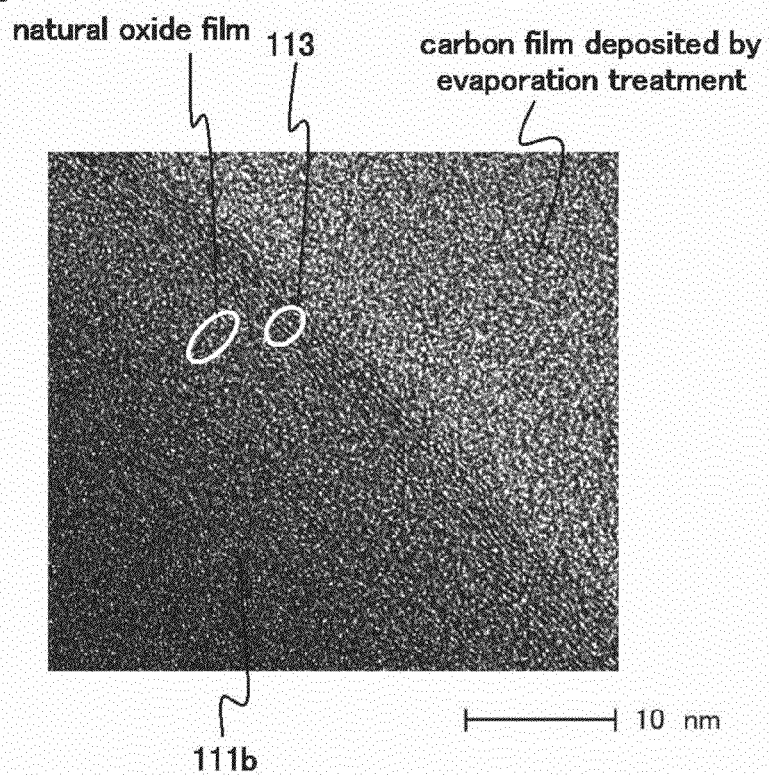

FIG. 6B shows an enlarged view of a dotted rectangle in FIG. 6A. Note that the magnification of FIG. 6B is 2050000 times. FIG. 6B shows that graphene which corresponds to the first region 113 in FIGS. 1A and 1B was formed around the active materials including a whisker in Electrode A. The thickness of the graphene was about from 2 nm to 3 nm. Note that as seen in FIG. 6B, a natural oxide film is formed between the active material including a whisker and the graphene.

Figure 7A:
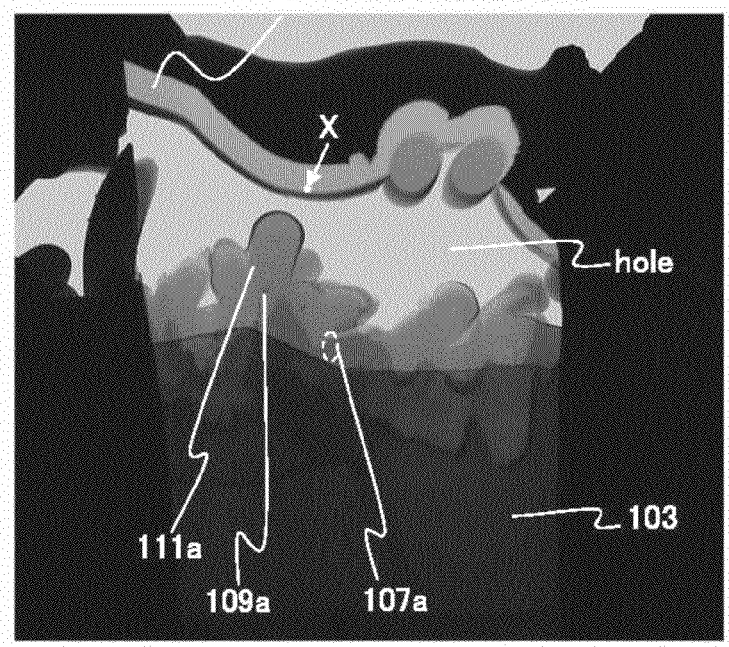
FIGS. 7A and 7B are cross-sectional TEM images of a surface of an electrode for a power storage device according to one embodiment of the present invention.

Moreover, FIG. 7A is a cross-sectional TEM image of a different part of Electrode A from the part in FIG. 6A. In FIG. 7A, an active material including a plurality of whiskers was also formed over the titanium sheet (the conductive layer 103) like in FIG. 6A. Further, the active material including a whisker includes a core having a structure having crystallinity (corresponds to the core 109a in FIG. 1A) and an outer shell having an amorphous structure (corresponds to the outer shell 111a in FIG. 1A).

Figure 7B:
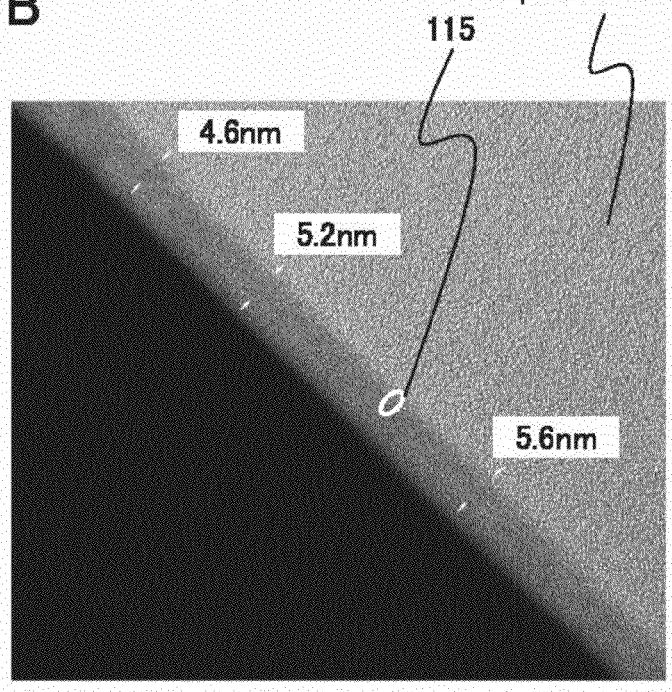

FIG. 7B shows an enlarged view of a region at a point X in FIG. 7A. Note that the magnification of FIG. 7B is 2050000 times. As seen in FIG. 7B, graphene which corresponds to the second region 115 in FIGS. 1A and 1B is formed in Electrode A. The thickness of the graphene was about from 4.6 nm to 5.6 nm, which indicates that the graphene is thicker than the graphene (the first region 113) formed around the active material including a plurality of whiskers shown in FIG. 6B. In addition, a carbon film which had been deposited by evaporation treatment in the observation was formed over the second region 115. Moreover, holes were observed between the active materials including a plurality of whiskers and the second region 115. Note that a black region in FIG. 7B is a processed residue attached in the observation.

Further, in Electrode A, graphene which corresponds to the second region 115 in FIGS. 10A and 10B (the electrode 200) was observed. In particular, the graphene was observed noticeably in a region above a dotted line portion in FIG. 5A. The graphene was spread continuously and provided over the active material including a plurality of whiskers in the region. In other words, the graphene 116 is spread uniformly in the planar direction of the active material layer 108 (the active material including a plurality of whiskers) and in contact with the active material including a plurality of whiskers in the region.

According to this example, in the electrode for the power storage device according to one embodiment of the present invention, a core which has a structure having crystallinity is provided in the active material including a plurality of whiskers and graphene which has high conductivity (high electron mobility) is provided between the active materials including a plurality of whiskers. Therefore, it can be said that the electrode for the power storage device according to one embodiment of the present invention has excellent electric characteristics.

In addition, according to this example, in the electrode for the power storage device according to one embodiment of the present invention, an active material having an amorphous structure and an outer shell having an amorphous structure are provided between a conductive layer and an active material layer (in particular, an active material including a plurality of whiskers). Therefore, it can be said that in the electrode for the power storage device according to one embodiment of the present invention, even if the volume of an active material is changed due to occlusion and release of ions, the structure of the electrode is not easily damaged, for example, pulverization and separation.

Example 2

In this example, electric characteristics of a power storage device which is an embodiment of the present invention will be described. Specifically, as the power storage device, a lithium ion secondary battery was manufactured and evaluated.

A method for manufacturing a coin-type secondary battery is described below with reference to FIG. 8.

As illustrated in FIG. 8, the coin-type secondary battery includes an electrode 401, a reference electrode 403, a separator 405, an electrolyte (not shown), a housing 407, and a housing 409. Besides, the coin-type secondary battery includes a ring-shaped insulator 411, a spacer 413, and a washer 415. As the electrode 401, Electrode A obtained by the process shown in Example 1 was used. The reference electrode 403 includes a reference electrode active material layer 417. The reference electrode active material layer 417 was formed using lithium foil. The separator 405 was formed using polypropylene. The housing 407, the housing 409, the spacer 413, and the washer 415 each of which was made using stainless steel (SUS) were used. The housing 407 and the housing 409 electrically connect the electrode 401 and the reference electrode 403 to the outside.

The electrode 401, the reference electrode 403, and the separator 405 were soaked in the electrolyte. Then, as illustrated in FIG. 8, the housing 407, the electrode 401, the separator 405, the ring-shaped insulator 411, the reference electrode 403, the spacer 413, the washer 415, and the housing 409 were stacked in this order such that the housing 407 was positioned at the bottom of the stacked components. The housing 407 and the housing 409 were crimped with a "coin cell crimper". In such a manner, the coin-type secondary battery (called Secondary Battery A) was formed.

The electrolyte in which $LiPF_6$ was dissolved in a mixed solvent of ethylene carbonate (EC) and diethyl carbonate (DEC) and the concentration was adjusted to be 1 mol/L was used.

Figure 9A:
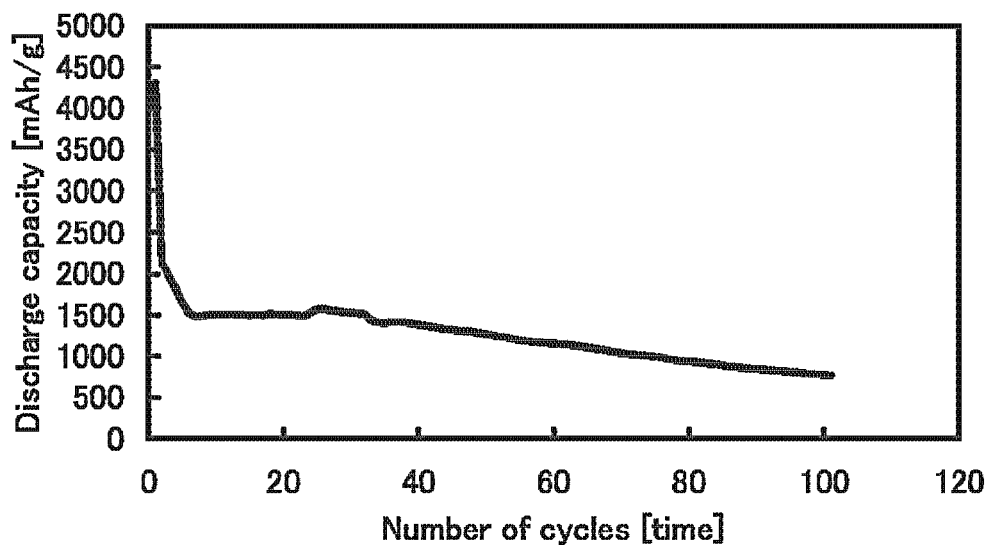
FIGS. 9A and 9B are graphs showing cycle characteristics and charge/discharge characteristics of a power storage device according to one embodiment of the present invention.

The charge/discharge cycle characteristics of the Secondary Battery A which were formed through the above steps was evaluated. FIG. 9A shows the result of cycle characteristics of the obtained Secondary Battery A. In FIG. 9A, only a discharging curve is shown for simplicity, and the horizontal axis indicates the number of cycles (unit: time), and the vertical axis indicates discharge capacity (unit: mAh/g). Charging and discharging were in one cycle, and the one cycle was performed 100 times. The first charging rate and the discharging rate were each 0.2 C, and the second or later charging rate and the discharging rate were each 0.5 C. Note that the potential range is from 0.03 V to 1.0 V (vs. $Li/Li^+$).

Figure 9B:
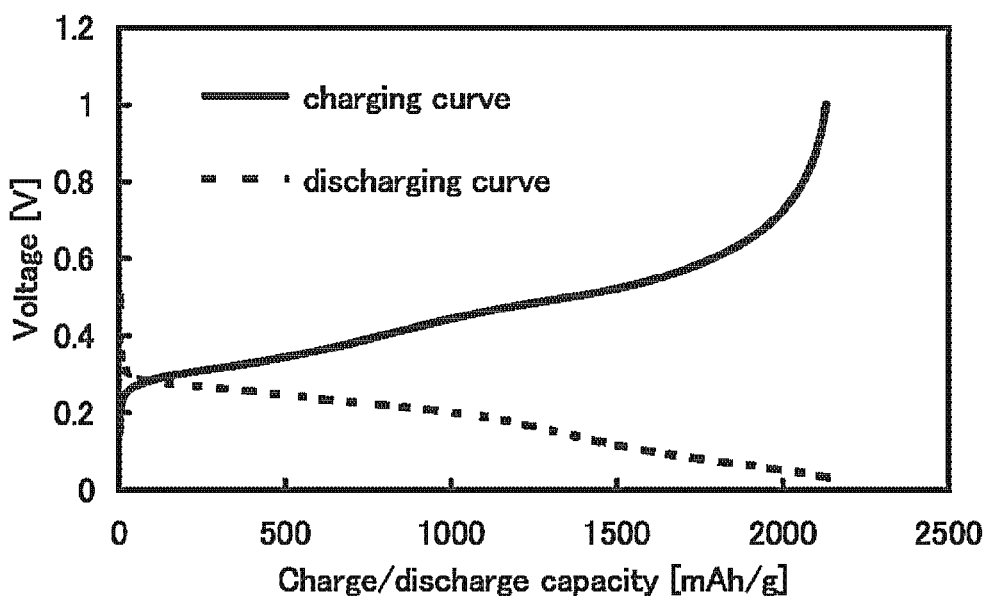

Moreover, FIG. 9B shows the charging and discharging curves in the second cycle. In FIG. 9B, the solid line shows the charging curve and the dotted line shows the discharging curve. Further, the horizontal axis indicates charge/discharge capacity (unit: mAh/g), and the vertical axis indicates voltage at the time of charging and discharging (unit: V).

From FIGS. 9A and 9B, it can be confirmed that Secondary Electrode A including Electrode A obtained by the process shown in Example 1 can charge and discharge, and functions as a lithium ion secondary battery.

This application is based on Japanese Patent Application serial no. 2011-179958 filed with Japan Patent Office on Aug. 19, 2011, the entire contents of which are hereby incorporated by reference.

What is claimed is:

1. An electrode for a power storage device, comprising:
   a conductive layer; and
   an active material layer over the conductive layer,
   wherein the active material layer includes graphene, an active material and a hole,
   wherein the active material has an uneven surface,
   wherein the graphene is provided to be attached to the uneven surface of the active material, and
   wherein the hole included in the active material layer is surrounded with the graphene.

2. The electrode for a power storage device, according to claim 1,
   wherein the active material including a plurality of whiskers includes at least a core and an outer shell provided to cover the core, wherein the core has a structure having crystallinity, and
wherein the outer shell has an amorphous structure.

3. The electrode for a power storage device, according to claim 1,
wherein the active material including a plurality of whiskers comprises silicon.

4. The electrode for a power storage device, according to claim 1,
wherein a material of the conductive layer comprises one selected from the group consisting of titanium, zirconium, hafnium, vanadium, niobium, tantalum, chromium, molybdenum, tungsten, cobalt and nickel.

5. The electrode for a power storage device, according to claim 1,
wherein a proportion of elements except hydrogen and carbon included in the graphene is lower than or equal to 15 atomic % or a proportion of elements except carbon included in the graphene is lower than or equal to 30 atomic %.

6. A power storage device including the electrode, according to claim 1.

7. An electronic appliance including the power storage device, according to claim 6.

8. An electrode for a power storage device, comprising:
a conductive layer; and
an active material layer over the conductive layer,
wherein the active material layer includes graphene, an active material and a hole, wherein the active material has a plurality of whiskers,
wherein the graphene is provided to be attached to the plurality of whiskers of the active material, and
wherein the hole included in the active material layer is surrounded with the graphene.

9. The electrode for a power storage device, according to claim 8,
wherein the plurality of whiskers include at least a core and an outer shell provided to cover the core,
wherein the core has a structure having crystallinity, and
wherein the outer shell has an amorphous structure.

10. The electrode for a power storage device, according to claim 8,
wherein the plurality of whiskers comprise silicon.

11. The electrode for a power storage device, according to claim 8,
wherein a material of the conductive layer comprises one selected from the group consisting of titanium, zirconium, hafnium, vanadium, niobium, tantalum, chromium, molybdenum, tungsten, cobalt and nickel.

12. The electrode for a power storage device, according to claim 8,
wherein a proportion of elements except hydrogen and carbon included in the graphene is lower than or equal to 15 atomic % or a proportion of elements except carbon included in the graphene is lower than or equal to 30 atomic %.

13. A power storage device including the electrode, according to claim 8.

14. An electronic appliance including the power storage device, according to claim 13.

* * * * *